(12) United States Patent
Lukos

(10) Patent No.: US 8,220,520 B2
(45) Date of Patent: Jul. 17, 2012

(54) SPRING BIASED SLIDE ARRANGEMENT FOR ANTI-BOW ROLLER TUBE

(76) Inventor: Stephen Lukos, Watertown, CT (US)

( * ) Notice: Subject to any disclaimer, the term of this patent is extended or adjusted under 35 U.S.C. 154(b) by 746 days.

(21) Appl. No.: 12/152,836

(22) Filed: May 15, 2008

(65) Prior Publication Data

US 2008/0289775 A1   Nov. 27, 2008

Related U.S. Application Data

(63) Continuation-in-part of application No. 11/086,819, filed on Mar. 22, 2005, now Pat. No. 7,770,625, which is a continuation-in-part of application No. 10/943,302, filed on Sep. 17, 2004, now Pat. No. 7,134,473.

(51) Int. Cl.
*E06B 9/42* (2006.01)
(52) U.S. Cl. ..................... 160/242; 160/323.1
(58) Field of Classification Search .......... 160/242, 160/323.1, 900, 246–261; 248/251–272
See application file for complete search history.

(56) References Cited

U.S. PATENT DOCUMENTS

| | | | |
|---|---|---|---|
| 30,236 A | 10/1860 | McLean | |
| 120,971 A | 11/1871 | Hoffmeister | |
| 131,328 A | 9/1872 | Binder | |
| 477,512 A | 6/1892 | Combis et al. | |
| 1,595,234 A | 8/1926 | Kuyper | |
| 1,611,413 A | 12/1926 | Case | |
| 1,638,707 A * | 8/1927 | Rufty | 248/267 |
| 1,696,050 A * | 12/1928 | Morin | 248/254 |
| 1,742,549 A | 1/1930 | MacArthur et al. | |
| 1,797,321 A | 3/1931 | Cahill | |
| 1,825,198 A | 9/1931 | Negrini | |
| 1,855,010 A * | 4/1932 | Coleman | 248/271 |
| 2,094,178 A * | 9/1937 | Mead | 160/254 |
| 2,248,414 A | 7/1941 | Schane | |
| 2,894,578 A | 7/1959 | Caesar et al. | |
| 3,421,568 A | 1/1969 | Youngs | |
| 3,595,511 A | 7/1971 | Summerville, Jr. | |
| 3,882,921 A | 5/1975 | Sandall | |
| 3,900,063 A | 8/1975 | Roller | |
| 4,180,117 A | 12/1979 | Greer | |
| 4,220,189 A * | 9/1980 | Marquez | 160/23.1 |
| 4,223,714 A | 9/1980 | Weinreich et al. | |
| 4,323,105 A | 4/1982 | Berman et al. | |
| 4,344,474 A | 8/1982 | Berman | |

(Continued)

FOREIGN PATENT DOCUMENTS

DE    196 54 668    4/1998

(Continued)

*Primary Examiner* — David Purol

(57) ABSTRACT

A support assembly is provided for a roller tube that holds sheet material. The support assembly has opposed first and second mounts adapted to support the roller tube when rotatably coupled to the mounts. The mounts can include slides having a slide member that slides within a slide bracket. A support cradle is disposed between the first and second mounts. The support cradle is configured to support the roller tube along a length thereof. Various spring elements can be arranged to apply a force to the roller tube in an upward direction when the roller tube is positioned to dispense material therefrom in a downward direction, thereby preventing the sheet material from telescoping and/or from dragging or binding against the support cradle as it winds and/or unwinds, while also keeping the material from being wound tighter at the ends than across the rest of the roller tube.

21 Claims, 18 Drawing Sheets

U.S. PATENT DOCUMENTS

| | | |
|---|---|---|
| 4,416,511 A | 11/1983 | Weinberg |
| RE31,793 E | 1/1985 | Berman et al. |
| 5,121,782 A | 6/1992 | Renkhoff et al. |
| 5,230,377 A | 7/1993 | Berman |
| 5,423,506 A | 6/1995 | Spoon |
| 5,492,162 A | 2/1996 | Lohausen |
| 5,819,831 A | 10/1998 | Schanz |
| 6,006,810 A | 12/1999 | Malott |
| 6,024,152 A | 2/2000 | Rosenich |
| 6,059,007 A | 5/2000 | Tomita |
| 6,164,428 A | 12/2000 | Berman et al. |
| 6,290,164 B1 | 9/2001 | O'Connor et al. |
| 6,357,686 B1 | 3/2002 | Imai et al. |
| 6,402,110 B1 | 6/2002 | Berman et al. |
| 6,817,399 B2 | 11/2004 | Berman et al. |
| 7,013,946 B2 * | 3/2006 | Beck et al. ............... 160/370.22 |
| 7,134,473 B2 | 11/2006 | Lukos |
| 2004/0129850 A1 | 7/2004 | Kirby |

FOREIGN PATENT DOCUMENTS

| | | |
|---|---|---|
| EP | 0 745 742 | 12/1996 |
| EP | 0 792 978 | 9/1997 |
| EP | 1 030 003 | 8/2000 |

* cited by examiner

SPRING BIASED SLIDE ARRANGEMENT FOR ANTI-BOW ROLLER TUBE

This application is a continuation-in-part of U.S. patent application Ser. No. 11/086,819 filed on Mar. 22, 2005, which was a continuation-in-part of U.S. patent application Ser. No. 10/943,302 filed on Sep. 17, 2004, now U.S. Pat. No. 7,134,473, all incorporated herein by reference.

BACKGROUND

The present invention relates to the rolling and unrolling of sheet material for such uses as solar screens and awnings, image (e.g., video and movie) projection screens, blackout screens, and insect blocking screens and more particularly, to a roller tube assembly including a spring biased roller tube slide and integral support cradle for a roll-fed sheet material.

Conventional roller tube systems make use of flexible sheet materials supported by elongated roller tubes. The roller tube, typically made from aluminum or steel, is rotatably supported and provides support for the flexible sheet material on the roller tube. Roller tube systems include manual and motorized systems. Manual roller tube systems have spring or gear driven roller tubes. Motorized roller tube systems have drive motors engaging the roller tube to rotatably drive the tube. The drive motors for motorized roller tube systems include externally mounted motors engaging an end of the roller tube and internal motors that are received within an interior defined by the tube.

Conventional roller tube systems have support systems that engage the opposite ends of the roller tube to provide the rotatable support that is required for winding and unwinding of the flexible sheet material. The support system includes a drive end support assembly having a coupler engaging the open end of the tube for rotation. The coupler is adapted to receive the drive shaft of a motor such that rotation of the drive shaft is transferred to the coupler for rotation of the tube. The motor is secured to a bracket for attachment of the roller tube system to the wall or ceiling of a structure, for example. A coupler engaging an opposite end of the roller tube could receive a motor drive shaft or, alternatively, could receive a rotatably supported shaft of an idler assembly.

A roller tube supported in a conventional manner from the opposite ends will deflect in response to transverse loading, from the weight of an attached sheet material, for example. The response of a roller tube, supported at its ends in a conventional manner, from the weight of a flexible sheet material as well as from self-weight of the tube, results in a downward "sagging" deflection in a central portion of the roller tube with respect to the supported ends.

For roller tubes used with wider sheet materials (e.g., widths of 10 to 30 feet or more), support of the correspondingly long roller tubes in a conventional manner can result in sagging deflection detrimental to the appearance of a supported sheet material. V-shaped wrinkles, also known as "smiles", can be formed in an unrolled sheet material supported by a sagging roller tube. Sagging deflection in a conventionally supported roller tube can also have a detrimental effect on operation. Moreover, any deflection in the roller tube can cause permanent damage to the sheet material (e.g. fabric, vinyl, polyester, acrylic, fiberglass). Video projection screen material is particularly prone to damage reducing visibility and performance over time.

During winding and/or unwinding of a sheet material, the sheet material is drawn onto the tube in a direction that is substantially perpendicular to the axis of the tube. Due to curvature along the length of a sagging tube, opposite end portions of a supported roller tube system will tend to track towards the center portion of the tube as the sheet material is rolled onto the tube. Such uneven tracking can cause the opposite end portions of the sheet material to be wound more tightly onto the end portions of the roller tube than the central portion of the roller tube. As a result, the central portion of the sheet material is not pulled tightly to the tube causing it to tend to buckle. This buckling of the central portion of the sheet material, if severe enough, can create variations in radial dimensions of the rolled sheet material along the length of the tube, thereby impairing subsequent rolling of lower portions of the sheet material. Uneven tracking can also cause surface discontinuities, known as "golf balling," that include a permanent sagging pocket shaped discontinuity in the sheet material. After each revolution of the roller tube, as the material winds up on the tube, the imperfections (e.g., wrinkles) in the material, and particularly in the center thereof, will worsen.

The problem of sagging deflection in longer roller tubes has been addressed in prior art roller tube systems by increasing the diameter of the roller tube. Although increasing the roller tube diameter serves to reduce sagging deflection in conventional end-supported tubes, there are undesirable consequences associated with such a solution. Increasing the diameter of the roller tube increases weight, thereby potentially affecting the size and type of structure capable of providing rotatable support for the tube. Also, additional space required by the larger diameter roller tube and its associated support structure may not be readily available in many installations. Even if space is available, the bulky nature of the system due to the required large roller tube diameter is often objectionable for aesthetic reasons.

Other prior art attempts at preventing sagging involve the use of center supports and/or elongate support rollers in a variety of configurations located below the rotational axis of the roller tube. The elongate support rollers add weight and complexity to the roller tube system. The increased costs and failure mechanisms inherent in the more complex support systems diminish the advantages provided.

It has also been discovered by the present inventor that when the roller tube includes a drive motor within one end thereof, the sheet material (e.g., fabric) tends to wind tighter on the motor side of the roller tube. It is very important, however, that the material wind up evenly across the whole roller tube. A weight bar is provided at the leading edge of the material that unwinds from the tube. One indication that the material is winding evenly is that the weight bar remains parallel with the roller tube.

It would be advantageous to provide apparatus to ensure that roller tube sagging is prevented without the added costs and complexity of the prior art systems. It would be further advantageous to provide apparatus to ensure that the sheet material rolls up evenly on the roller tube, even when there is a motor within one end of the roller tube. It would be still further advantageous to provide a sliding mount arrangement for the ends of the roller tube, to allow the exterior surface of the material on the roller tube to remain in contact with a support cradle that supports the roller tube, all during the time that material is unwound from (and rewound on) the roller tube. The present invention provides the aforementioned and other advantages.

SUMMARY OF THE INVENTION

In accordance with the present invention, apparatus is provided for slidingly supporting a roller tube. A first slide has a first slide bracket and a first slide member adapted to slide within said first slide bracket. The first slide member is adapted to carry a first end of a roller tube. A second slide has a second slide bracket and a second slide member adapted to slide within said second slide bracket. The second slide member is adapted to carry a second end of the roller tube. The first and second slide brackets are mounted at respective opposite ends of a roller tube housing with the roller tube extending from the first end thereof to the second end thereof within the housing between the slide brackets.

The apparatus can further comprise a first spring coupled to the first slide member for applying a first force to the first end of the roller tube in an upward direction when the roller tube is positioned in the housing to dispense material therefrom in a downward direction. Typically, the first spring is provided at the end of the roller tube that contains a motor. In such an embodiment, the first spring compensates, at least in part, for the weight of the motor. A second spring may be coupled to the second slide member for applying a second force to the second end of the roller tube in an upward direction when the roller tube is positioned in the housing to dispense material therefrom in a downward direction. The second spring may not be necessary, as the first spring alone may be adequate to enable the material to wind up on the roller tube evenly. In the event a second spring is required, it is often possible to use a lighter spring than the first spring, particularly when the first spring is offsetting the weight of the motor and the second spring is not. One reason to provide a second spring at the idler end of the roller tube would be to reduce the force of the roller tube against the support cradle in order to prevent the free cut end of the material on the roller tube from stretching, curling or getting wavy due to the pressure of the material against the support cradle. This same consideration also applies to the motor side of the roller tube, and the spring(s) on that side serve a similar function to prevent unwanted deviations at the edge of the cut fabric.

The first spring can comprise, for example, a pair of coil springs, each having a first end attached to an end plate of the housing and a second end attached to the first slide member. The second spring, when used, can also comprise, for example, a pair of coil springs, each having a first end attached to an end plate of the housing and a second end attached to the second slide member. The apparatus can further comprise a first mounting plate affixed to the first slide member and a second mounting plate affixed to the second slide member. The second ends of the first pair of coil springs can be attached to the first slide member via the first mounting plate. The second ends of the second pair of coil springs can be attached to the second slide member via the second mounting plate.

In another embodiment, the first spring comprises a spring plunger mounted to the housing, with a plunger member thereof exerting pressure against an edge of the first slide member to provide the first force. The second spring can comprise a spring plunger mounted to the housing, with a plunger member thereof exerting pressure against an edge of the second slide member to provide the second force.

In another embodiment, the first spring comprises a spring plunger mounted to the first slide member, with a plunger member thereof exerting pressure against the housing to provide the first force. The second spring, if used, comprises a spring plunger mounted to the second slide member, with a plunger member thereof exerting pressure against the housing to provide the second force.

In yet another embodiment, the first spring comprises a first pair of spring plungers mounted to the first slide member, with a plunger member of each of the first pair exerting pressure against the housing to provide the first force. The second spring, if used, comprises a second pair of spring plungers mounted to the second slide member, with a plunger member of each of the second pair exerting pressure against the housing to provide the second force.

In a further embodiment, the first spring comprises an adjustable compression spring exerting pressure on a first linkage member. The first linkage member is coupled to a first shaft portion at the first end of the roller tube, the first shaft portion being coupled to the first slide member, The second spring comprises an adjustable compression spring exerting pressure on a second linkage member, the second linkage member being coupled to a second shaft portion at the second end of the roller tube. The second shaft portion is coupled to the second slide member.

Each of the first and second slide brackets can comprise opposed slots or rails on which corresponding rails or slots of the respective first and second slide members ride.

Apparatus is also disclosed for slidingly supporting a roller tube, in which the roller tube has a first shaft portion extending from a first end thereof and a second shaft portion extending from a second end thereof. A first slide member is coupled to the first shaft portion. A second slide member is coupled to the second shaft portion. A first slide bracket receives the first slide member and allows the first slide member to slide therein. A second slide bracket receives the second slide member and allows the second slide member to slide therein. A first end plate has the first slide bracket mounted thereto. A second end plate has the second slide bracket mounted thereto. The first and second end plates are adapted for mounting on a structure such as a building or an interior wall, e.g., via a housing to which the end plates are attached. When so mounted, the first and second slide brackets, first and second slide members, and roller tube are disposed between the first and second end plates.

A housing can be provided for the assembly, the housing comprising the first end plate at one end thereof and the second end plate at an opposite end thereof. The housing can be adapted to dispense material wound around the roller tube. A first spring can be coupled to the first slide member for applying a first force to the first end of the roller tube in an upward direction when the roller tube is positioned in the housing to dispense material therefrom in a downward direction. A second spring can be coupled to the second slide member for applying a second force to the second end of the roller tube in an upward direction when the roller tube is positioned in the housing to dispense material therefrom in a downward direction. Where the roller tube has a motor therein at the first end thereof, and no motor in the second end thereof, it may not be necessary to provide the second spring.

In one embodiment, the first spring comprises a pair of coil springs, each having a first end attached to the first end plate and a second end attached to the first slide member. The second spring, if used, can also comprise a pair of coil springs, each having a first end attached to the second end plate and a second end attached to the second slide member.

A first mounting plate can be affixed to the first slide member. A second mounting plate can be affixed to the second slide member. The second ends of the first pair of coil springs can be attached to the first slide member via the first mounting plate. The second ends of the second pair of coil springs can be attached to said second slide member via the second mounting plate.

In a further embodiment, the first spring can comprise a spring plunger mounted to the housing, with a plunger member thereof exerting pressure against an edge of the first slide member to provide the first force. The second spring, if used, can also comprise a spring plunger mounted to the housing, with a plunger member thereof exerting pressure against an edge of the second slide member to provide the second force.

The first spring can alternatively comprise, for example, a spring plunger mounted to the first slide member, with a plunger member thereof exerting pressure against the housing to provide the first force. The second spring, if used, can comprise a spring plunger mounted to the second slide member, with a plunger member thereof exerting pressure against the housing to provide the second force.

In a further embodiment, the first spring comprises a first pair of spring plungers mounted to the first slide member, with a plunger member of each of the first pair exerting pressure against the housing to provide the first force. The second spring, if used, can comprise a second pair of spring plungers mounted to the second slide member, with a plunger member of each of the second pair exerting pressure against the housing to provide the second force.

In yet another embodiment, the first spring comprises an adjustable compression spring exerting pressure on a first linkage member, the first linkage member being coupled to the first shaft portion. The second spring comprises an adjustable compression spring exerting pressure on a second linkage member, the second linkage member being coupled to the second shaft portion.

BRIEF DESCRIPTION OF THE DRAWINGS

Referring now to the figures, wherein like elements are numbered alike.

DETAILED DESCRIPTION OF THE INVENTION

Figure 1:
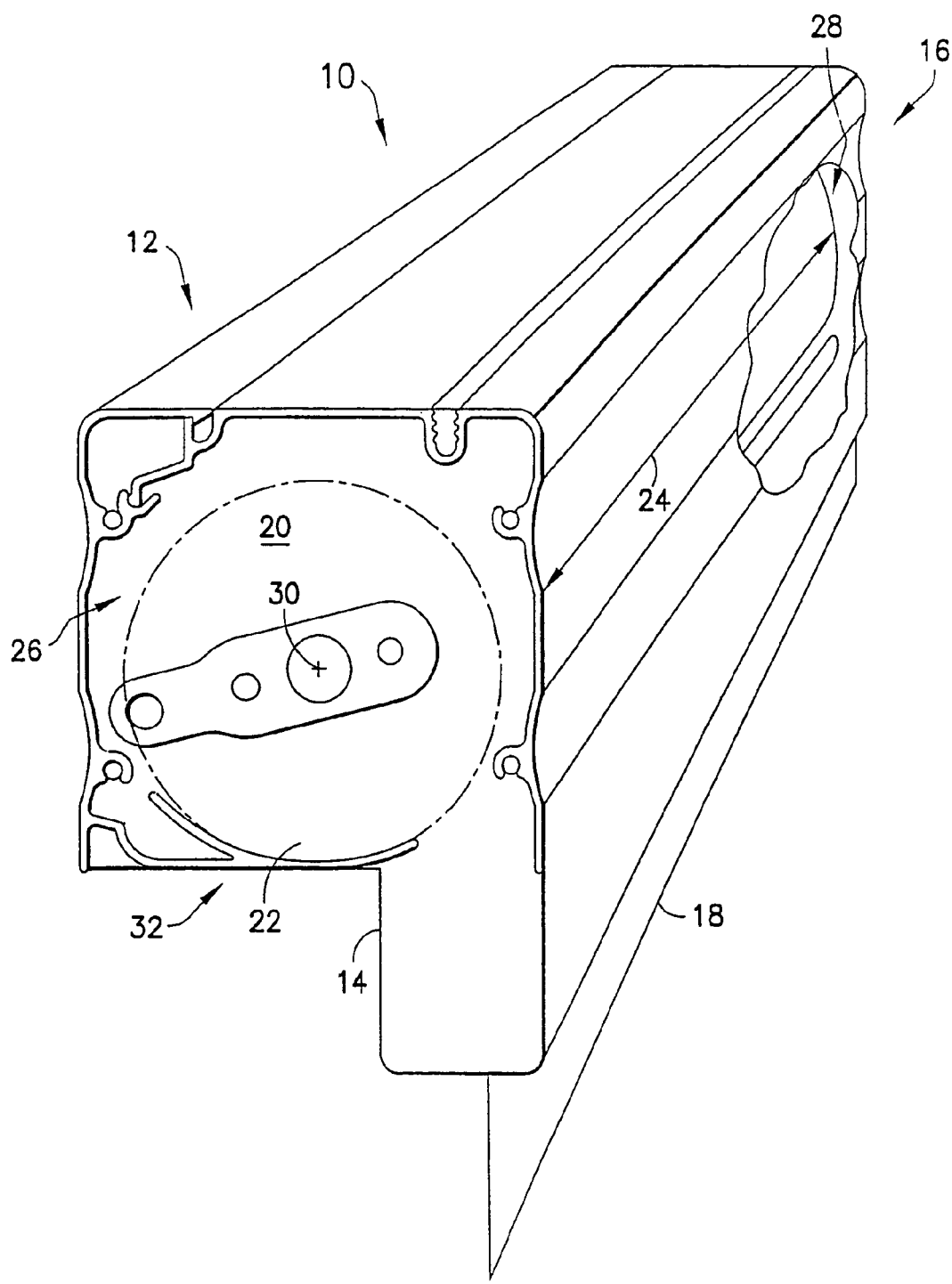
FIG. 1 is a perspective view of an example roller tube support assembly.

A roller tube support assembly in accordance with the present invention can include a first mount and a second mount opposite each other. The assembly can be configured to rotatably support a roller tube between the first mount and the second mount. The roller tube includes a body defining a length between a first end and a second end. The roller tube can be configured to support a sheet material wound around the roller tube body along the length of the body between the first and second ends of the body. Alternatively, the roller tube can be configured to support multiple widths of sheet material wound around the roller tube body to provide a single roller tube system for adjacent windows separated by mullions. A support cradle can be coupled to the assembly between the first and second mounts. The support cradle can be configured to support the roller tube. A biasing member is arranged to reduce a force of the roller tube in a direction towards the support cradle. By reducing the force of the roller tube towards the support cradle, the biasing member reduces the friction between the sheet material the support cradle.

Another important advantage of this structure is that it reduces the tightness at which the fabric winds onto the roller tube, particularly at the motor end of the roller tube which is heavier than the opposite "idler" end of the tube. In addition, the torque generated by the motor at the motor end of the roller tube may cause a slide, in which the tube is carried, to twist. This twist will increase the friction within the slide and make it more difficult for the motor end of the roller tube to slide up within a housing as the material is rolled onto the tube, as compared to the idler end of the tube. This increased friction on the slide also causes a tighter winding of the fabric or other material at the motor end of the tube. Some fabrics, such as woven PVC or urethane coated fabrics, are more prone to being affected by the weight of the motor and the additional friction between the support cradle and the fabric. In accordance with the present invention, the biasing member can be provided in such a way that an offset force is applied to the slide which will counteract the twist in the slide that is caused by the motor torque. This can be accomplished, for example, by placing a spring or spring plunger off-center with respect to the slide member that slides within the slide bracket.

The reduction of force may also reduce any likelihood that the sheet material will drag with too much friction on the support cradle as it is wound onto and/or unwound from the roller tube. The reduced force on the roller tube will also serve to extend the life of the sheet material wound on the tube by reducing friction between the sheet material and the cradle support. For example, a sheet material configured for image projection may have a coating that could deteriorate due to excessive abrasive contact between the sheet material and the support cradle. The sheet material can comprise, for example, one of a solar screen or awning material for an awning, such as lateral arm awnings or retractable window awnings, a screen configured to shade sunlight, a screen configured to block light, a fabric configured to shade sunlight, an image projection screen configured for, e.g., video or movie projection, a screen configured to block insects, or any other flexible sheet material retracted periodically as is known in the art.

Figure 2:
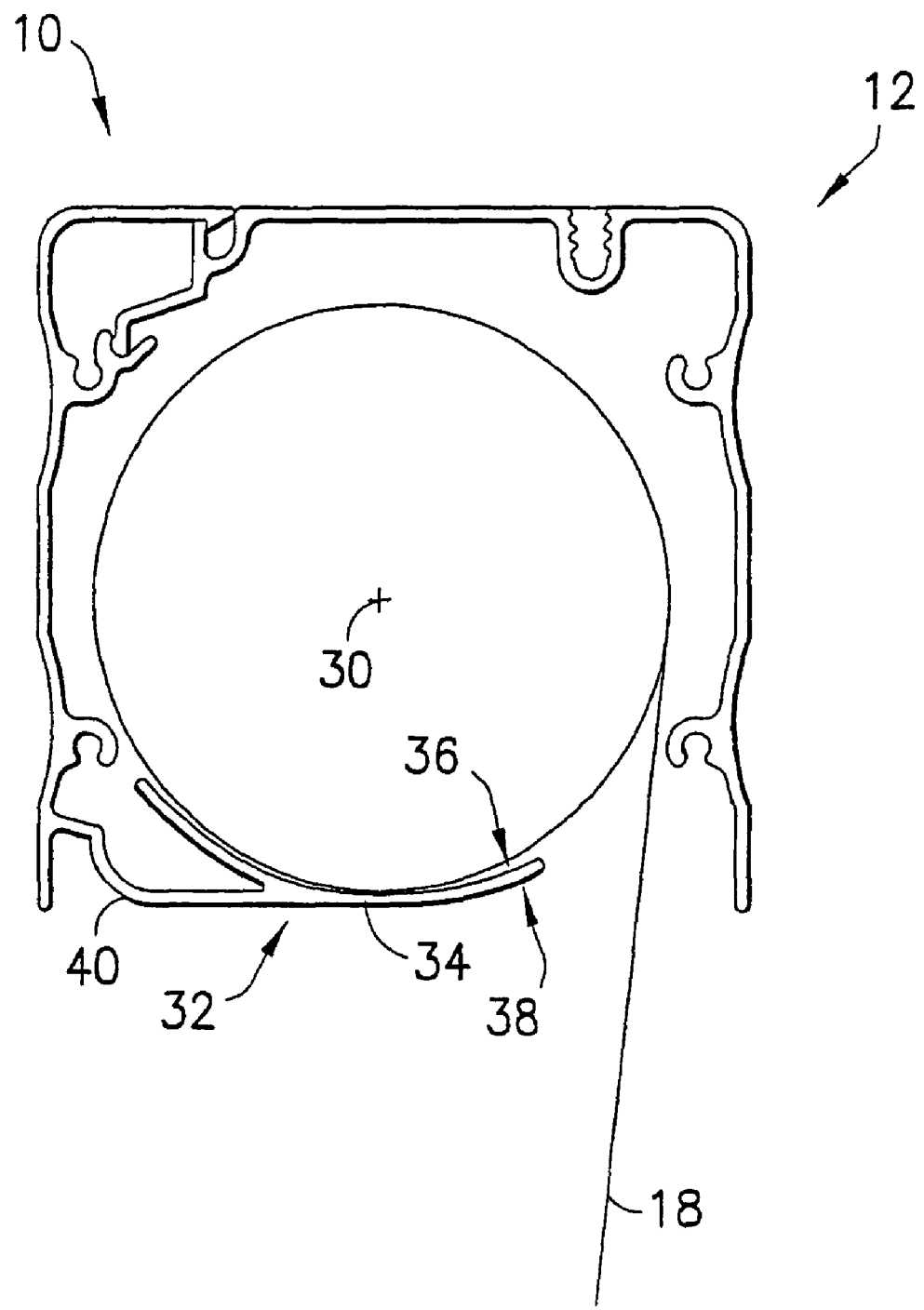
FIG. 2 is a side view of an example roller tube support assembly.

FIGS. 1 and 2 illustrate example embodiments of the roller tube mechanism 10. The roller tube mechanism 10 includes an assembly 12 that extends laterally between a first mount 14 and a second mount 16 opposite the first mount 14. The assembly 12 can be mounted on a wall, ceiling, or the like, to provide a stable position to deploy a sheet material 18. The assembly 12 can be constructed of a rigid material through various means including, for example, extruded aluminum, and the like.

A roller tube 20 is rotatably mounted in the assembly 12. The roller tube 20 can be pivotably supported on the first mount 14 and second mount 16. The roller tube 20 includes a roller tube body 22 that extends along a length 24 between a first end 26 and a second end 28. The roller tube body 22 can have a cylindrical shape including a circular cross-section extending along the length 24. The roller tube 20 is configured to support the sheet material 18, such as solar screen material. The sheet material 18 can be wound around the roller tube body 22 about an axis of rotation (axis) 30 of the roller tube 20. As the sheet material 18 is wound (wrapped) around the roller tube body 22, the diameter of the roller tube 20 and sheet material 18 increases. As the sheet material is unwound, the diameter of the roller tube 20 and sheet material 18 decreases.

A support cradle 32 is coupled to the assembly 12. The support cradle 32 extends between the first mount 14 and the second mount 16. The support cradle 32 is configured to support the roller tube 20 and sheet material 18 wound thereon. More specifically, the support cradle 32 supports the roller tube 20 along the entire length 24 of the roller tube 20. The roller tube 20 is prevented from bowing along the length 24 due to the support from the support cradle 32. In an example embodiment, the support cradle 32 can comprise a portion of the assembly 12. In another embodiment, the support cradle 32 can be formed separate from the assembly 12 and coupled to the assembly 12.

The support cradle 32 is positioned such that the roller tube 20 and sheet material 18 rest on top of the support cradle 32. The support cradle 32 can be positioned such that an upper surface 36 contacts the sheet material near a lower portion of the roller tube 20 below the axis 30. The support cradle 32 can support the roller tube 20 and sheet material 18 throughout the winding and unwinding of the sheet material 18 during which the outer diameter of the sheet material 18 on the roller tube 20 varies. As used herein, the concept of contact between the roller tube and the support cradle generally means contact between the sheet material wound on the roller tube and the support cradle, unless the material is completely unwound from the roller tube. Moreover, the concept of supporting the roller tube also means supporting the sheet material wound on and/or hanging from the roller tube. Generally, when sheet material is wound on the roller tube, the roller tube will be supported by the support cradle via the sheet material.

The support cradle 32 comprises a base 34 including the upper surface 36 and a lower surface 38. The base 34 can be formed into an elongate arcuate beam cupped to support the arcuate shape of the outer diameter of the roller 20 and sheet material 18 wrapped on the roller 20. The base 34 can include a width that extends outward a distance sufficient to support the roller 20 without snagging or binding to roller 20. In another example embodiment, the base 34 can include a width approximately the size of a quarter of the outer perimeter of the roller 20 and sheet material 18 thereon. A coupling arm 40 can extend from the lower surface 38 and couple to the assembly 12. In a preferred embodiment, the base 34 can have a crescent shaped cross-section. In another embodiment, the base 34 can be a circular cross-section, or the like. The shape of the support cradle 32 can substantially mate to the shape of the roller tube 20 and sheet material 18. In a preferred example embodiment, the upper surface can include a coating (not shown) that enables the sheet material 18 to slide across the support cradle upper surface 36 without sticking, being marked, or discolored. Preferably, the upper surface 36 is coated (e.g., painted) to prevent the surfaces of the sheet material 18 from being marked (e.g., by aluminum oxide) as the material 18 winds and/or unwinds. Alternatively, the support cradle 32 can be manufactured using a material such as high-density polyethylene, PVC, or the like.

The tip of the support cradle 32 can be capped with a material having a low coefficient of friction (not shown) such as high density polyethylene, or the like, to prevent the surfaces of the material 18 from being marked and reduce the likelihood of the sheet material 18 binding on the support cradle 32. The support cradle 32 is rigid and does not move relative to the roller tube 20, sheet material 18 or assembly 12. The support cradle 32 can extend the entire length 24 of the roller tube 20 in a preferred embodiment. It is also contemplated that the support cradle 32 can extend substantially the length 24 of the roller tube 20 and variations thereof. In an example embodiment, the support cradle 32 can be integrally formed from the assembly 12. The support cradle 32 can extend in a single contiguous length. In another embodiment, the support cradle 32 can include segmentation and discontinuities along the length and/or the width of the base 34. The support cradle 32 prevents the roller tube 20 from deflecting along the length 24 and resultantly prevents surface discontinuities from forming in the sheet material 18 as the sheet material 18 is dispensed out of or rolled into the assembly 12.

Figure 3:
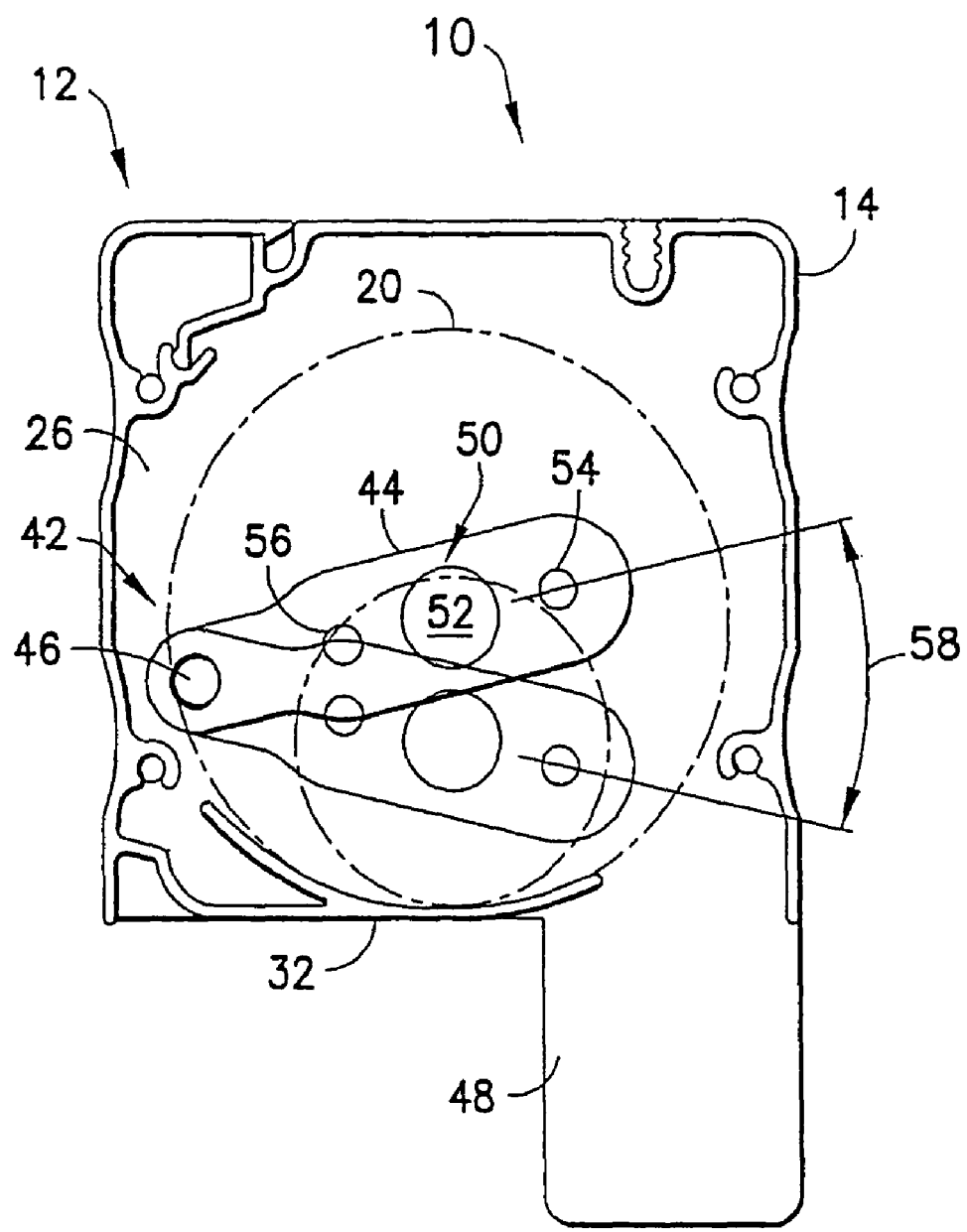
FIG. 3 is a side view of an example roller tube support assembly.

Referring to FIG. 3, an example roller tube mechanism 10 is illustrated from a side view. The roller tube 20 is supported on both ends 26 and 28, by the first mount 14 and second mount 16. The first and second mounts 14,16 include a configuration for receiving bearings and drive mechanisms of the roller tube 20. In the preferred example embodiment illustrated in FIG. 3, the mounts 14, 16 comprise a pivot arm assembly 42. The pivot arm assembly 42 includes a body 44 having a pivot mount 46 coupled to a cover plate 48. The body 44 includes at least one bearing mount 50, and in a preferred example embodiment, a central bearing receiver 52 bounded by opposing receivers 54, 56. The central bearing receiver 52 can receive an idler of the roller tube 20 and the opposing receivers 54, 56 can receive at least one of a drive motor and drive gears (not shown) or a pull chain and clutch mechanism (tape drive or chain drive) for the roller tube 20. In an example embodiment, the drive motor can be mounted inside the roller tube for a compact arrangement. The appropriate gearing and drive mechanism can be coupled to the drive motor as is known in the art.

The pivot arm assembly 42 illustrated in FIG. 3 is shown with a ghost image of the pivot arm assembly 42 to indicate the range of motion and capacity to pivot up and down with the roller tube 20. In a preferred example embodiment, the pivot arm assembly 42 can swing about pivot mount 46 through an angle 58. The angle 58 can include a range from about zero degrees to about 45 degrees depending on the roller tube 20 size and expected service. The first and second mounts 14, 16 are configured to support the roller tube 20 throughout the range of travel within the assembly 12. As the sheet material 18 winds and unwinds on the roller tube 20, the outside diameter of the roller tube 20 and material 18 wrapped thereon changes. The roller tube axis 30 moves relative to the cover plate 48 and fixed support cradle 32 (i.e., rotation and translation). Since the axis 30 translates as the roller tube 20 rotates about the axis 30, the receivers 52, 54, 56 should also move with the roller tube 20 and accompanying drive motor, gears and idlers associated with the roller tube 20. The example embodiment of the pivot arm assembly 42 provides both the rotary support as well as the lateral support for the roller tube 20 while maintaining the roller tube 20 supported by the fixed support cradle 32. It is noted that the pivot mount 46 may be slightly elongated to maintain the roller tube 20 centered over the support cradle 36.

Figure 4:
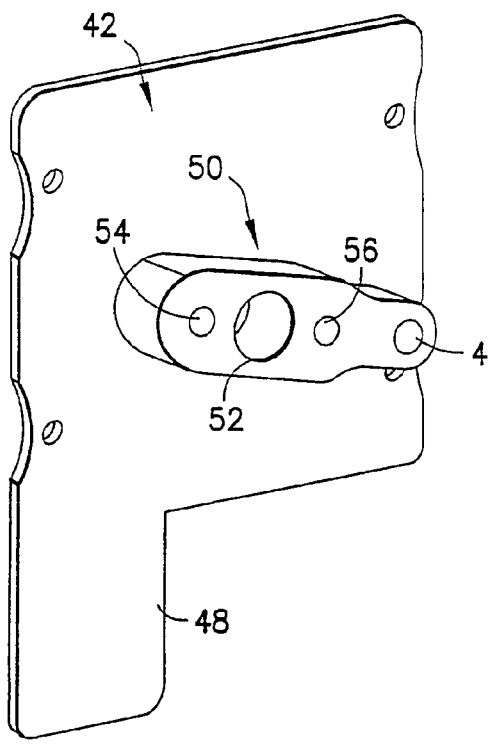
FIG. 4 is a perspective view of an example mount.
Figure 5:
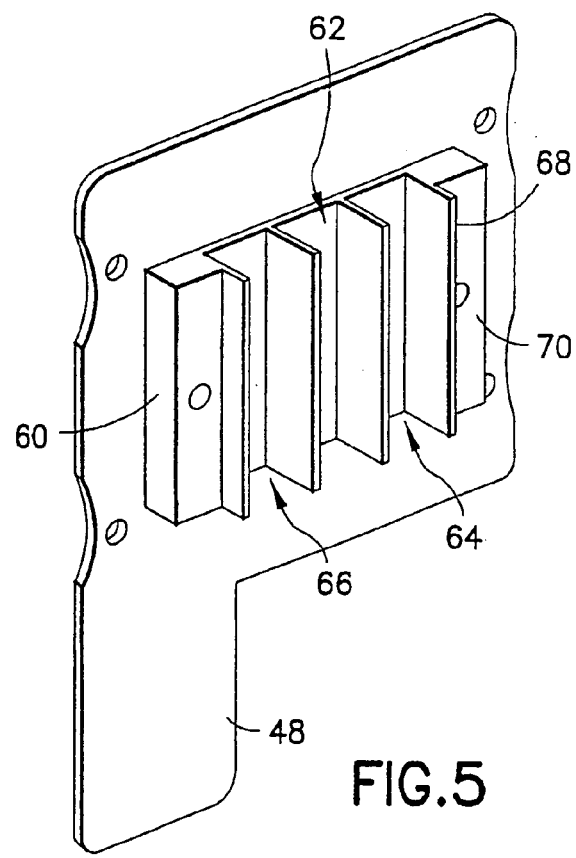
FIG. 5 is a perspective view of another example mount.
Figure 6:
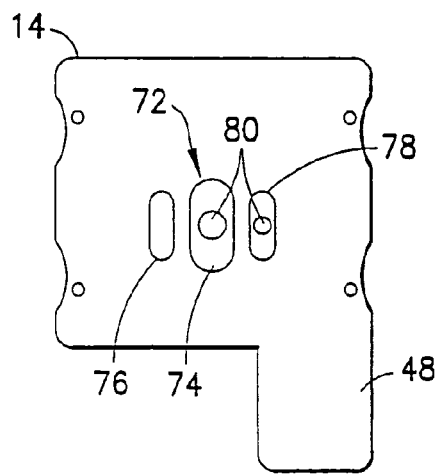
FIG. 6 is a perspective view of another example mount.

FIGS. 4 through 6 are views of example mounts 14, 16. FIG. 4 illustrates the pivot arm assembly 42, similar to the embodiment illustrated in FIG. 3. The pivot arm assembly 42 allows the roller tube 20 to be supported while concealing the mechanism. A superior appearance can be gained through concealing the pivot arm assembly 42 inside the assembly 12. Another embodiment is concealed behind the cover plate 48 of the mounts 14 and 16 as shown in FIG. 5.

In the embodiment of FIG. 5, a slotted insert 60 is attachable to the cover plate 48 of one or both of the mounts 14, 16. Alternatively, the slotted insert 60, mounts 14, 16, and cover plate 48 can all be formed as one piece, such as by casting. The slotted insert 60 serves the same function as the pivot arm assembly 42, of supporting the roller tube 20 in both translation and rotation. The slotted insert 60 includes an idler groove 62 formed between a pair of side grooves 64, 66. The idler groove 62 and side grooves 64, 66 can be formed as raised flanges 68 extending from a base 70. In another example embodiment, the idler groove 62 and side grooves 64, 66 can be machined into the base 70, cast in the base 70, attached to the base 70, and the like. The centrally located idler groove 62 can receive a bushing or bearing axle of an idler coupled to the roller tube 20. The side grooves 64, 66 can receive a bushing or bearing or axle of a drive motor and/or gears of the roller tube 20. The slotted insert 60 is also concealed behind the cover plate 48 and provides an aesthetic quality to the assembly 12. A less elaborate embodiment can include slots formed in the cover plate 48, as shown in FIG. 6. A slotted embodiment, as shown in FIGS. 5 and 6, is particularly advantageous for roller tubes carrying a large amount of sheet material, where the overall diameter is so large that a pivot arm (see FIG. 4) would not maintain the roller tube body approximately centered within the support cradle.

The embodiment of FIG. 6 includes at least one slot 72 formed in the cover plate 48 of the mount 14, 16. A central slot 74 and opposing side slots 76, 78 can be formed in the mounts 14, 16 to support the roller tube in both rotation and translation. The less complex embodiment of the slots 74, 76, 78 reduces manufacturing with an aesthetic tradeoff, since the ends of the bearings, axles and bushings, shown generally as 80, are visible from the exterior of the assembly 12.

Figure 7:
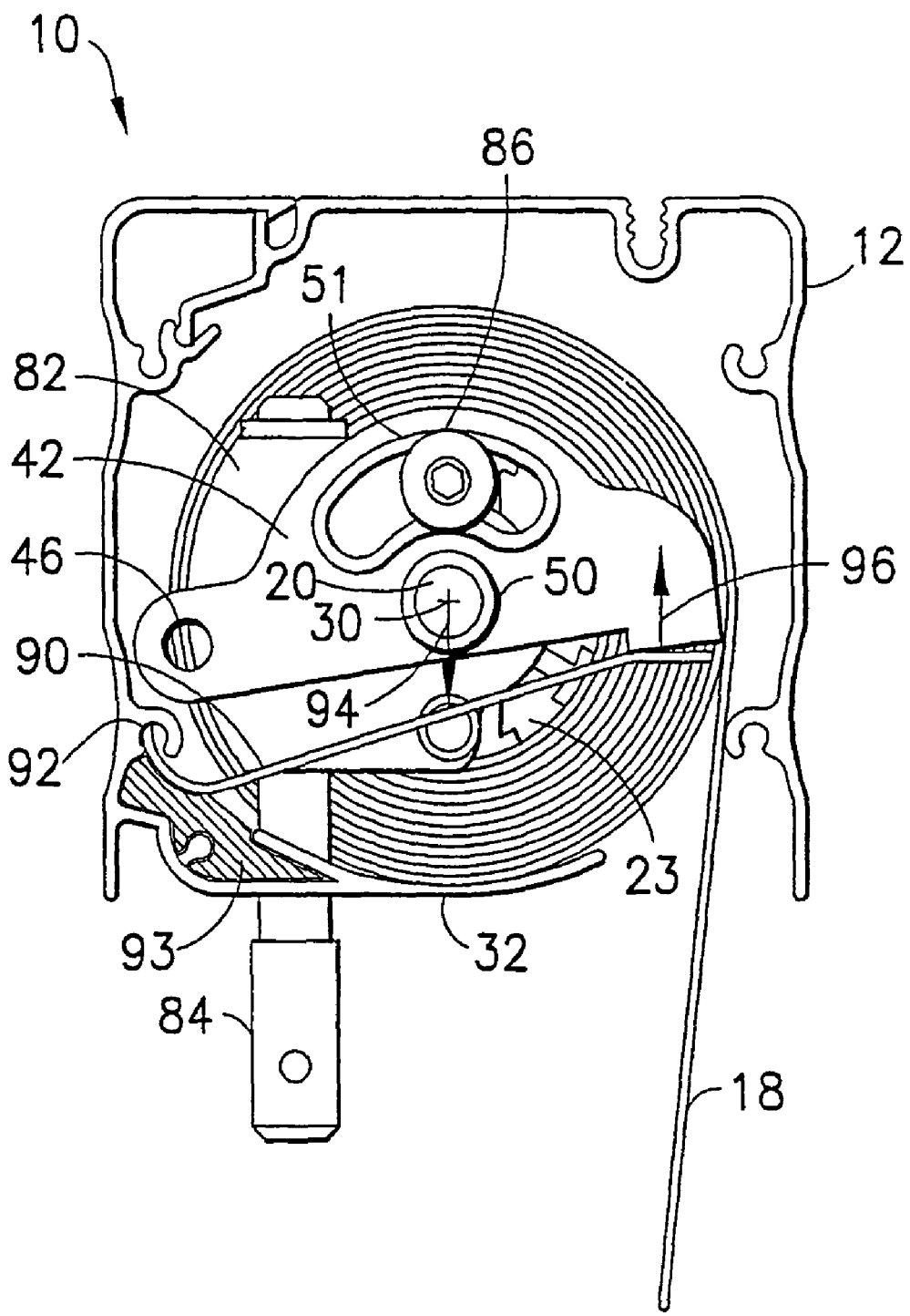
FIG. 7 is a side view of a first example roller tube support assembly.
Figure 8A:
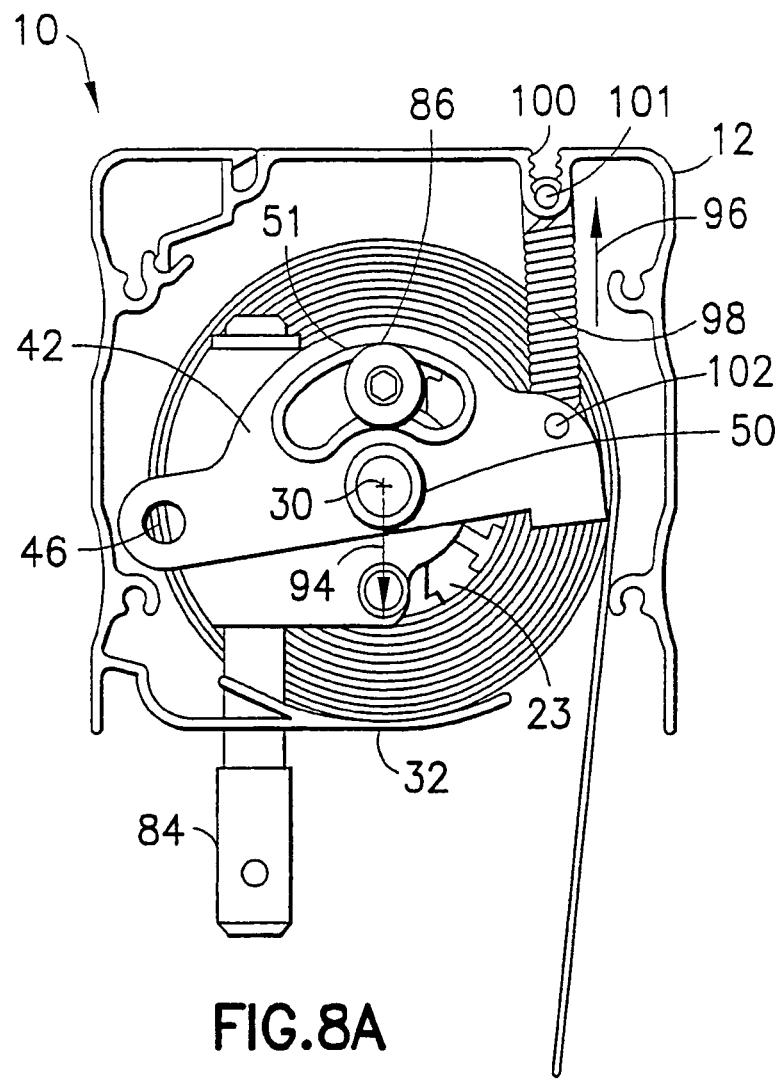
FIG. 8A is a side view of a second example roller tube support assembly.
Figure 8B:
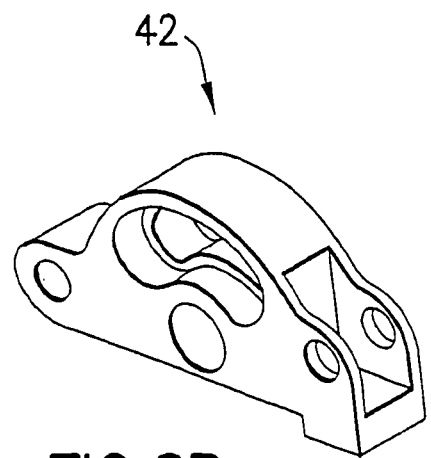
FIG. 8B is a perspective view of an example pivot arm assembly.
Figure 9:
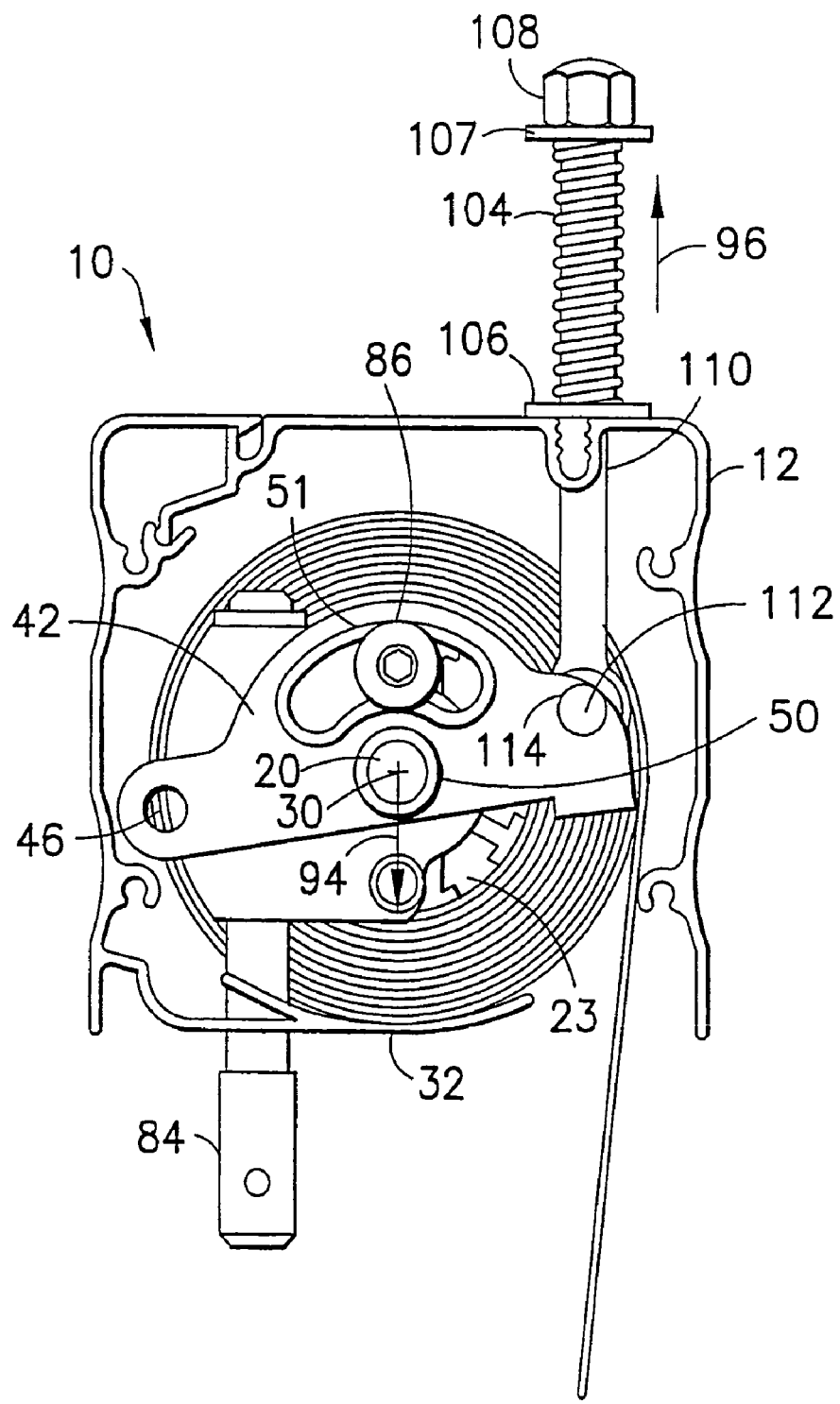
FIG. 9 is a side view of a third example roller tube support assembly.

FIGS. 7, 8A and 9 are side views of example biasing members 90, 98, and 104 shown in the assembly 12 as used with the pivot arm assembly 42 similar to the embodiment illustrated in FIG. 3. Configurations utilizing the idler groove depicted in FIG. 5 and the slots depicted in FIG. 6, not shown, may also be readily provided in accordance with this invention. The biasing members, 90, 98, and 104, reduce a force in a direction 94 towards the support cradle 32 by providing a force in an approximately opposite direction 96. FIG. 8B is a perspective view of an example pivot arm assembly 42.

FIG. 7 includes a biasing member in the form of a leaf spring 90 fixedly mounted in a spring retainer slot 92 provided integrally to the assembly 12. The leaf spring 90 is fixedly mounted below and to the left of the axis of rotation 30 of the roller tube 20. The leaf spring 90 continuously contacts the pivot arm assembly 42. A drive gear assembly 82 is attached to a roller tube end cap 23 affixed at an end of the roller tube 20. The drive gear assembly 82 is a conventional gear housing (e.g. worm gear) designed to rotatably wind and unwind the sheet material 18. A drive handle 84 extends from the drive gear assembly 82. Turning the drive handle 84 rotates the drive gear assembly 82. A gear mount 86 passes through a pivot mount slot 51 on the pivot arm assembly 42 connecting the pivot arm assembly 42 to the drive gear assembly 82. The pivot mount slot 51 allows the pivot arm to translate as the diameter of the roller tube 20 decreases or increases. The leaf spring biasing member 90 reduces the force of the roller tube 20 in the direction 94 of the support cradle 32 with a low cost and aesthetic result. The reducing force provided by the leaf spring 90 may be modified at the time of installation by replacing the leaf spring 90 with an alternate leaf spring having a different tension. Heavy and light tension leaf springs are available for use depending on the weight of the roller tube body 22 (see FIG. 1) and sheet material 18 and/or the torque of the drive motor. The installer can determine the appropriate leaf spring tension during installation. If the motor grinds, a heavier tension leaf spring is required. If the roller tube 20 lifts off the support cradle 32, a lighter tension leaf spring is required.

FIG. 8A provides another example embodiment of the biasing member in the form of a coil spring 98. This configuration provides increased flexibility in the force 96 provided. A spring retainer 100 is provided integral to the assembly 12 fixedly mounting the coil spring 98 above the axis of rotation 30 of the roller tube 20. A pin 101 passes through the assembly 12 and the coil spring 98 to pivotally attach the coil spring 98 to the assembly 12. A pivot arm coil spring mount 103 is provided on the pivot arm assembly 42 to attach the coil spring 98 to the pivot arm assembly 42. A second pin 102 passes through the pivot arm assembly 42 and the coil spring 98 to pivotally attach the coil spring 98 to the pivot arm assembly 42.

FIG. 9 provides a further example embodiment of the biasing member in the form of a compression spring 104. This configuration provides the most flexibility in the force 96 provided. However, the aesthetics are reduced because the functional parts are not internal to the assembly 12. A threaded eye rod 110 is fixedly mounted to the assembly 12 above the axis of rotation 30 of the roller tube 20. The compression spring 104 is mounted on the threaded eye rod 110 external to the assembly between a washer 106 and a washer 107 under the head of nut 108. The nut 108 may be adjusted to increase or decrease the force 96 provided by the compression spring 104. A pivot arm compression spring mount 112 is provided in the pivot arm assembly 42 through which a compression spring pin 114 pivotally attaches the threaded eye rod 110 to the pivot arm assembly 42.

Figure 10:
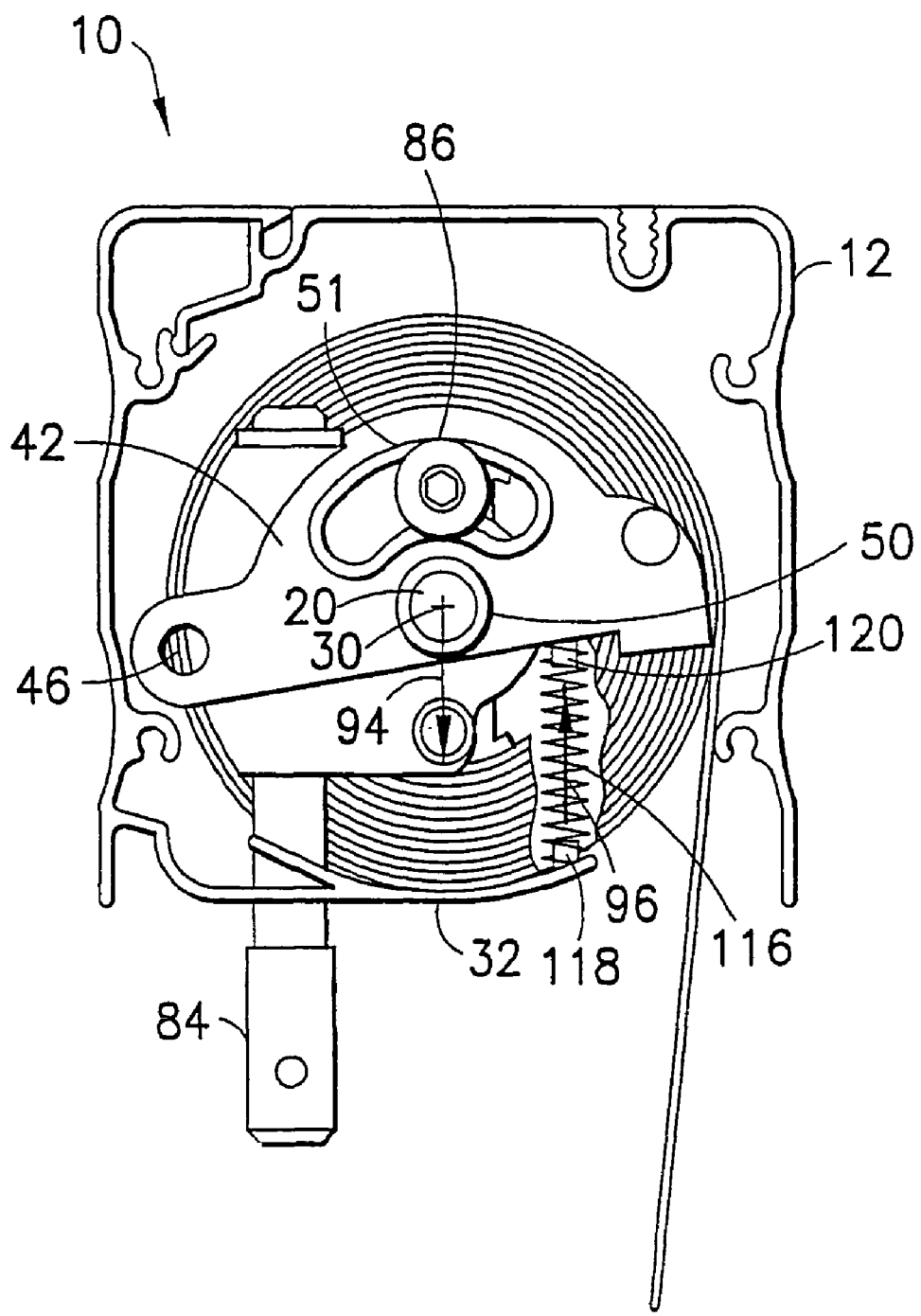
FIG. 10 is a side view of a fourth example roller tube support assembly.

FIG. 10 provides a further example embodiment of the biasing member in the form of an internal compression spring 116. A first spring retainer 118 may be fixedly mounted to, e.g., an outside edge of the support cradle 32. The first spring retainer 118 may be formed integral to the support cradle 32 such as by casting or extrusion, or may be fixedly mounted such as by a machine screw, bolt or similar means (not shown) as is common in the art. A second spring retainer 120 may be fixedly mounted to the pivot arm assembly 42. The second spring retainer 120 may be formed integral to the pivot arm assembly such as by casting or extrusion, or may be fixedly mounted such as by a machine screw, bolt or similar means (not shown) as is common in the art. The reducing force 96 may be adjusted by providing a different internal compression spring 116 with greater or lesser tension as may be required by the application. Alternatively, means of adjustment such as a threaded rod (not shown) may be provided to adjust the reducing force 96 without disassembly.

Figure 11:
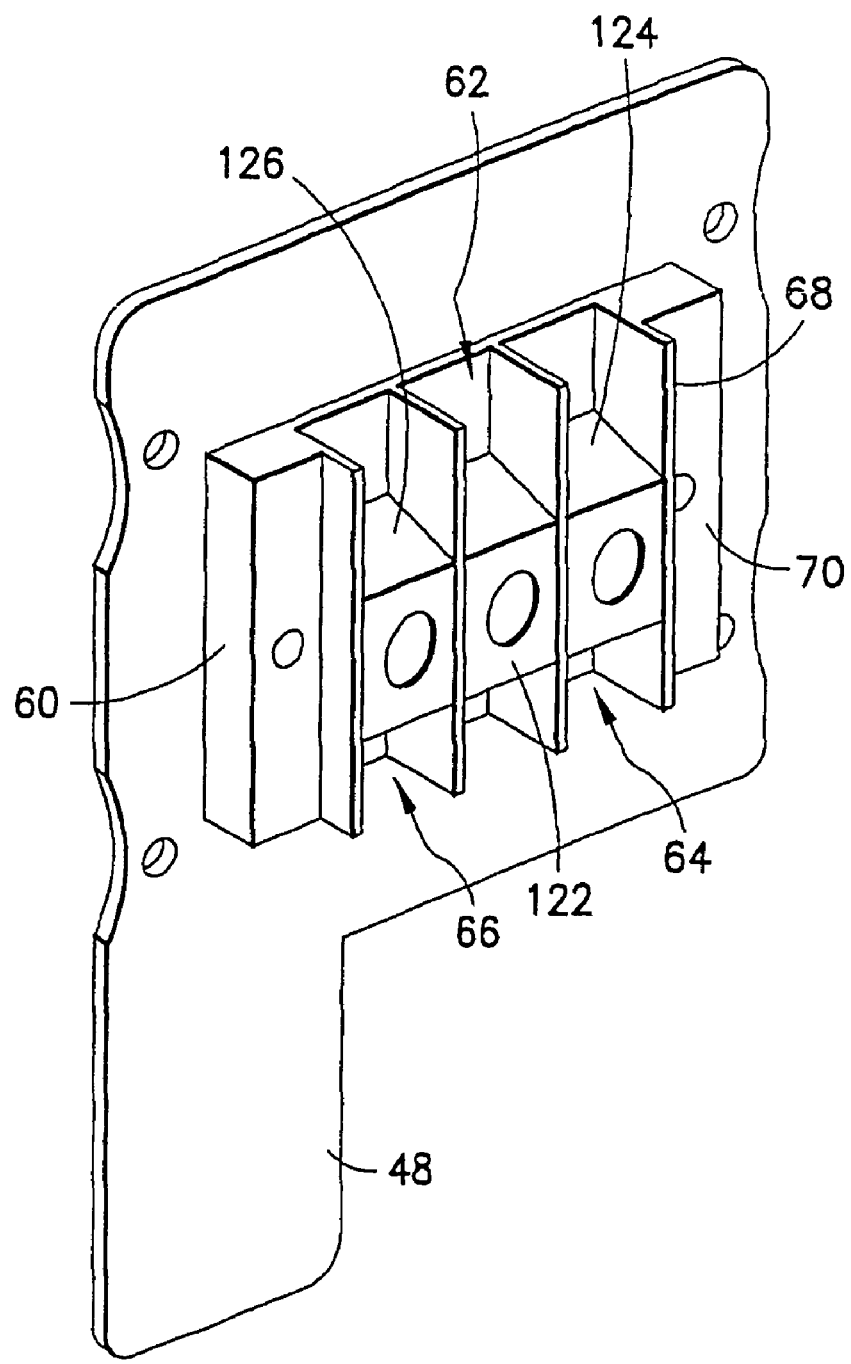
FIG. 11 is a perspective view of another example mount.

FIG. 11 is a perspective view of example mounts 14, 16 including a slotted embodiment similar to the slotted embodiment disclosed in FIG. 5. At least one sliding block 122 may be provided within the slots to guide the drive or idler for better rigidity and alignment. A central sliding block 122 may be movably positioned in an idler groove 62. A pair of side sliding blocks 124, 126 may be movably positioned within a pair of side grooves 64, 66. The sliding blocks may be aluminum, PVC or other durable material. The central sliding block 122 can receive a bushing or bearing axle of an idler coupled to the roller tube 20. The side sliding blocks 124, 126 can receive a bushing or bearing or axle of a drive motor and/or gears of the roller tube 20.

Figure 12:
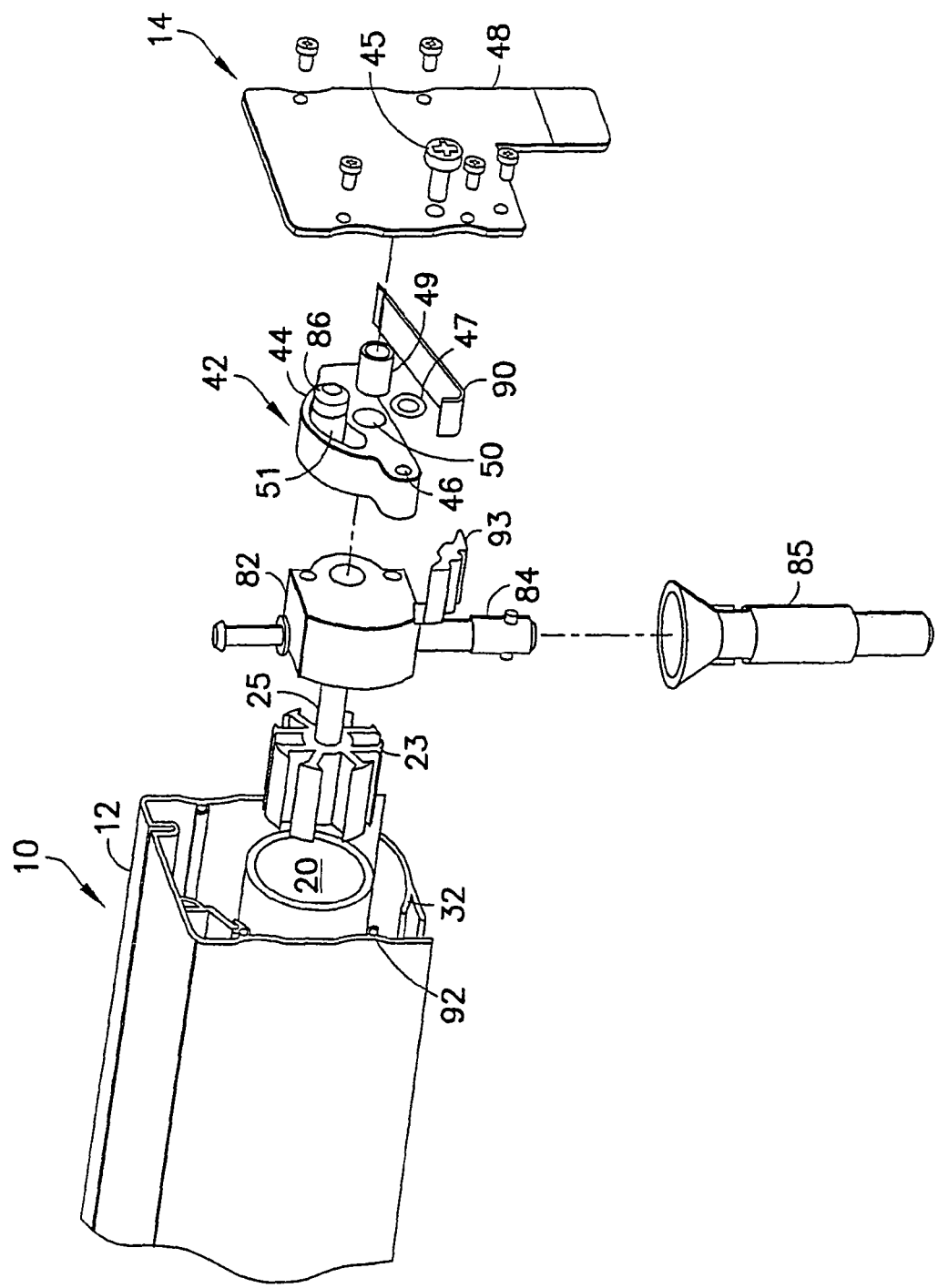
FIG. 12 is an exploded perspective view of an example roller tube support assembly.

FIG. 12 is an exploded perspective view of an example roller tube mechanism 10 including a pivot arm 42 mount and a leaf spring 90 biasing member. The roller tube mechanism 10 includes an assembly 12 that extends laterally between a first mount 14 and a second mount (not shown) opposite the first mount 14. The assembly 12 can be mounted on a wall, ceiling, or the like, to provide a stable position to deploy a sheet material (not shown).

A roller tube 20 is rotatably mounted in the assembly 12. The roller tube 20 can be pivotally supported on the first mount 14 and/or the second mount. The roller tube 20 is configured to support the sheet material (not shown). A support cradle 32 is coupled to the assembly 12. The support cradle 32 is configured to support the roller tube 20 and sheet material (not shown) wound thereon. In an example embodiment, the support cradle 32 can comprise a portion of the assembly 12. In another embodiment, the support cradle 32 can be formed separate from the assembly 12 and coupled to the assembly 12.

The first mount 14 can include a cover plate 48. A pivot support 45 passes through the cover plate 48 and a pivot washer 47 to pivotally support the pivot arm assembly 42. The pivot support 45 may be a machine screw, bolt or any other fixing mounting means. The pivot support 45 may be threadingly engaged directly into a pivot mount 46 of a pivot arm body 44. The pivot washer 47 may be a PVC or Teflon washer with a surface passing through the cover plate 48 to limit friction on the pivot support 45. The leaf spring 90 continuously contacts the pivot arm assembly 42. The leaf spring 90 may be fixedly mounted to the assembly 12 by a spring retainer 93 slidingly engaged in a spring retainer slot 92 located on the assembly 12. The spring retainer slot 92 may be formed integrally to the assembly 12 by casting or extrusion. The spring retainer 93 may be a machined or cast part of a metal such as aluminum or durable plastic formed to create a fixing surface between the leaf spring 90 and the assembly 12, particularly the spring retainer slot 92.

A drive gear assembly 82 is attached to a roller tube end cap 23 affixed at an end of the roller tube 20. The drive gear assembly 82 is a conventional gear housing (e.g. worm gear) designed to rotatably wind and unwind the sheet material (not shown). A drive handle 84 extends from the drive gear assembly 82. Turning the drive handle 84 rotates the drive gear assembly 82. A drive handle extension 85 may be provided to connect to the drive handle 84 and facilitate rotating the drive handle 84 via a crank (not shown). A gear mount 86 passes through a pivot mount slot 51 on the pivot arm assembly 42 connecting the pivot arm assembly 42 to the drive gear assembly 82. The gear mount may be a screw with a smooth shoulder threadingly engaged to the drive gear assembly 82 to allow the pivot arm to translate as the diameter of the roller tube 20 decreases or increases. The roller tube end cap 23 may be attached to the drive gear assembly 82 by a drive bar 25. The drive bar 25 may be square stock or other non-smooth shape so that rotation of the drive gear assembly 82 provides rotation of the roller tube end cap 23. The drive bar 25 passes through the drive gear assembly 82 and rotatingly engages the pivot arm assembly 42 in a bearing mount 50 via a bearing 49. The bearing 49 may be Teflon or smooth plastic to allow the drive bar 25 to smoothly rotate within the bearing mount 50 while maintaining the pivot arm assembly 42 relative to the roller tube 20.

Figure 13:
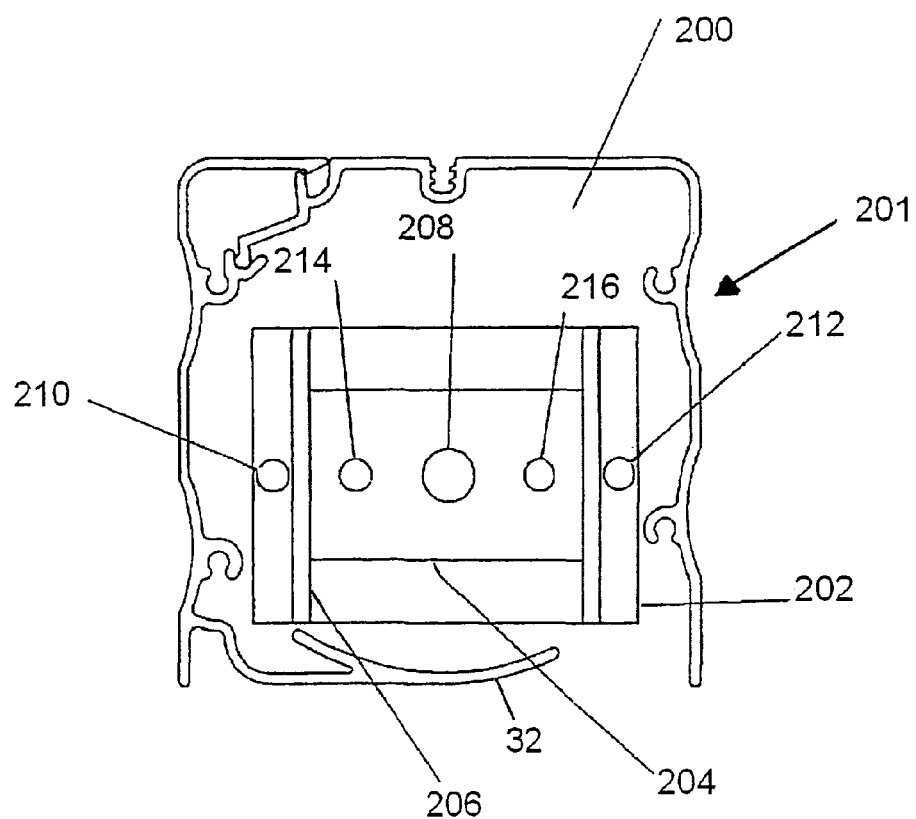
FIG. 13 is a view of a slide in which a slide member is mounted within a slide bracket within a roller tube housing.

FIG. 13 illustrates another example embodiment for the insert which holds and slidingly guides the roller tube. In particular, a slide generally designated 200 includes a slide bracket 202 and a slide member 204. Such a slide will be provided at each end of the roller tube, allowing the roller tube to slide up and down vertically within the housing assembly. In a preferred embodiment, a slide 200 is mounted to the inside of an end wall at each end of the housing, with the roller tube extending across the length of the housing and mounted between the slides. The slide member 204 includes rails 109 (FIG. 15, 20) that slide in slots 206. It should be appreciated that instead of the structure illustrated, the slide member 204 could include slots that engage rails extending from slide bracket 202.

Slide bracket 202 can be formed from any suitable material, either plastic or metal, but is preferably aluminum. Slide member 204 can also be formed from any suitable material, but is preferably high density polyethylene (HDPE). Mounting holes 210 and 212 in slide bracket 202 can be provided for mounting the slide bracket to a housing, such as the end cap 105 (FIG. 15) of the housing, generally designated 201. Holes 214 and 216 are provided in slide member 204 to allow the slide member to be mounted, e.g., to a drive motor internal to the roller tube. A hole 208 in slide member 204 receives a drive bar 25 (FIG. 12) or shaft extending from the roller tube, to rotatably support the roller tube as the slide member 204 slides within the slide bracket 202 along the slide bracket slot 206 in response to the winding and unwinding of material on the roller tube. In a preferred embodiment, the roller tube shaft 25 is made of aluminum. Moreover, the shaft is slightly smaller in diameter than the hole 208, so that it rotates smoothly within the hole 208.

It should be appreciated that as the sheet material winds onto and unwinds from the roller tube, the diameter of the material on the roller tube will increase and decrease, respectively. Since the outer surface of the material rests on the support cradle 32, the roller tube will move away from the support cradle as material is wound thereon, and will move closer to the support cradle as material is dispensed therefrom. The slides 200 which support the roller tube at each end thereof allow this movement of the roller tube toward and away from the support cradle.

Figure 14:
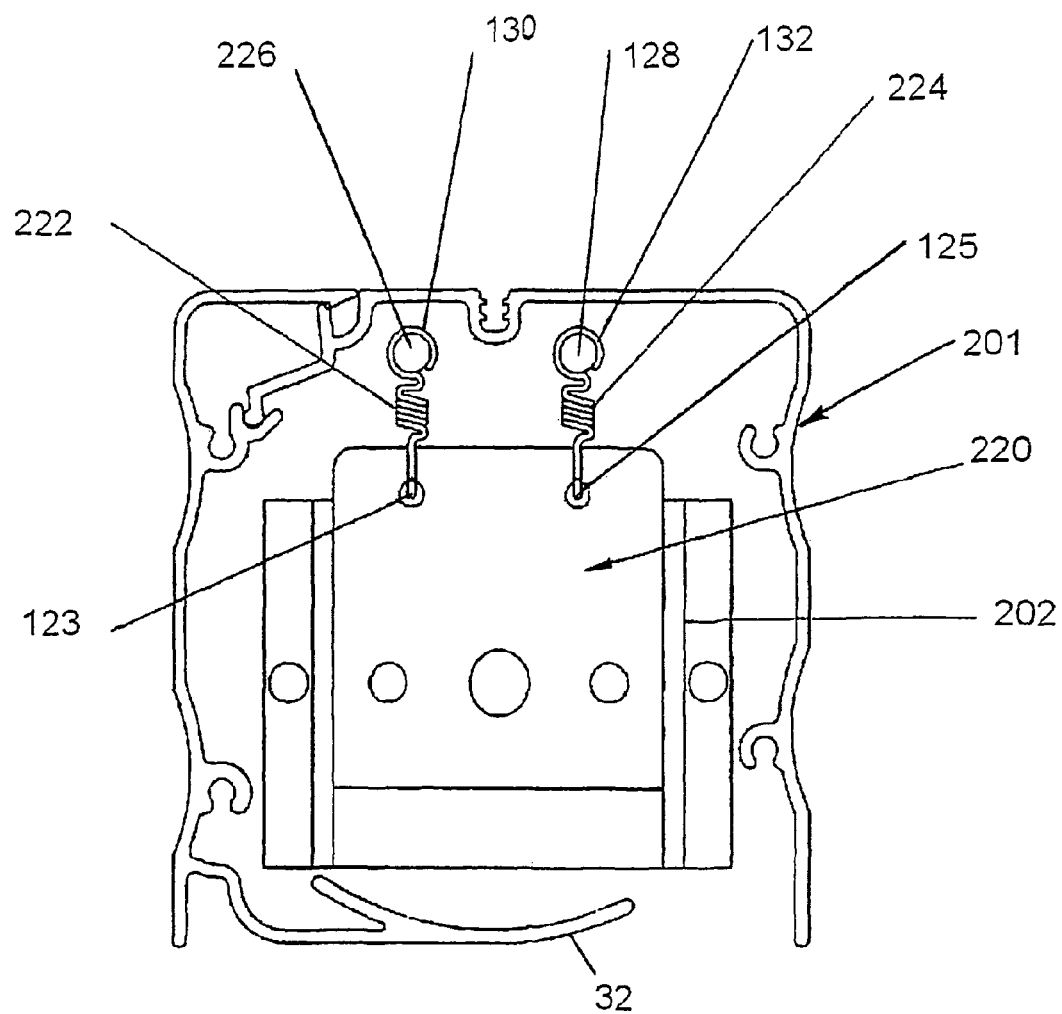
FIG. 14 is a view of the housing and slide of FIG. 13, showing a mounting plate attached to the slide member with a pair of springs mounted between the mounting plate and an end plate of the housing.
Figure 15:
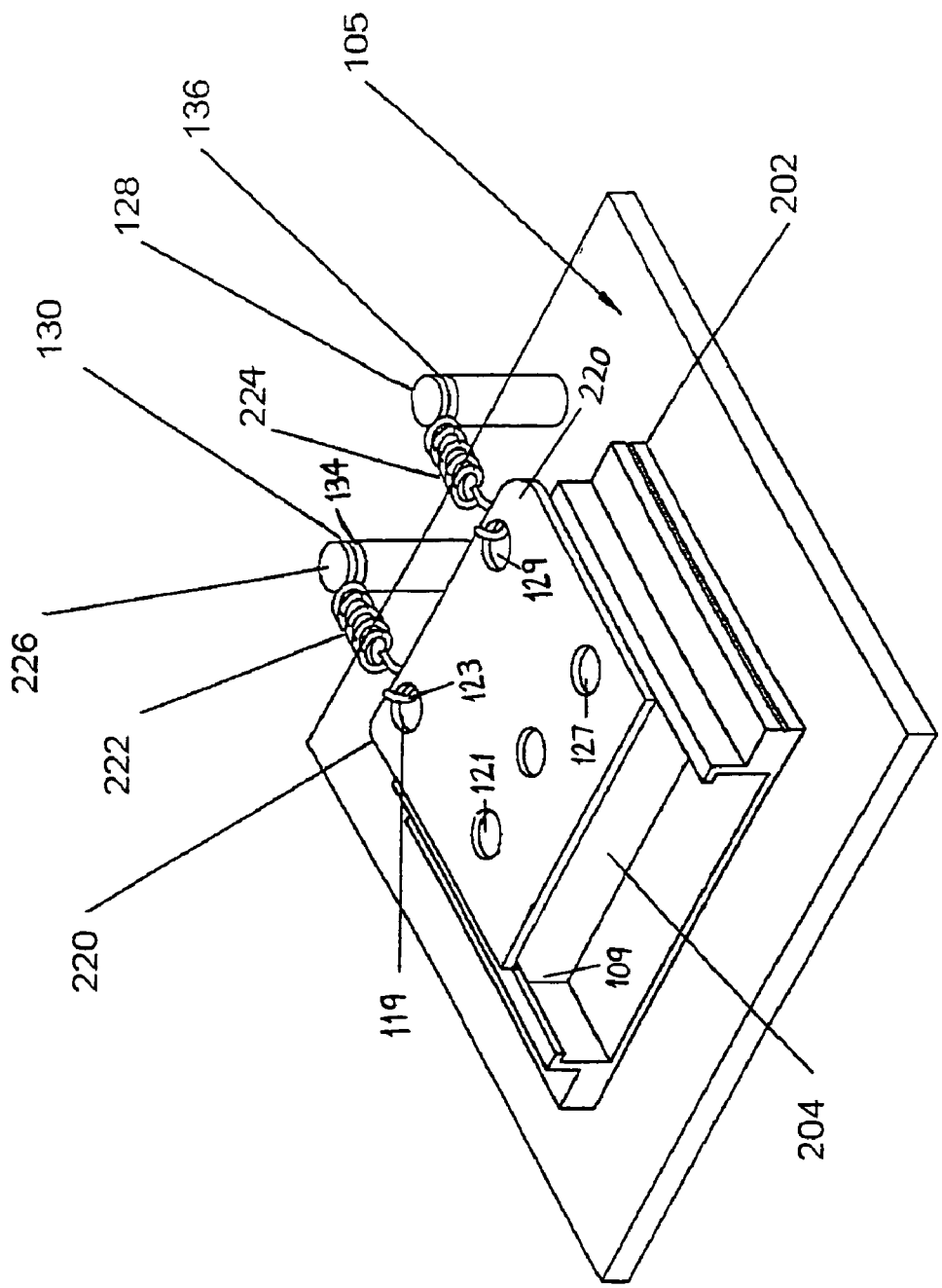
FIG. 15 is a perspective view of the slide and end plate shown in FIG. 14.
Figure 16:
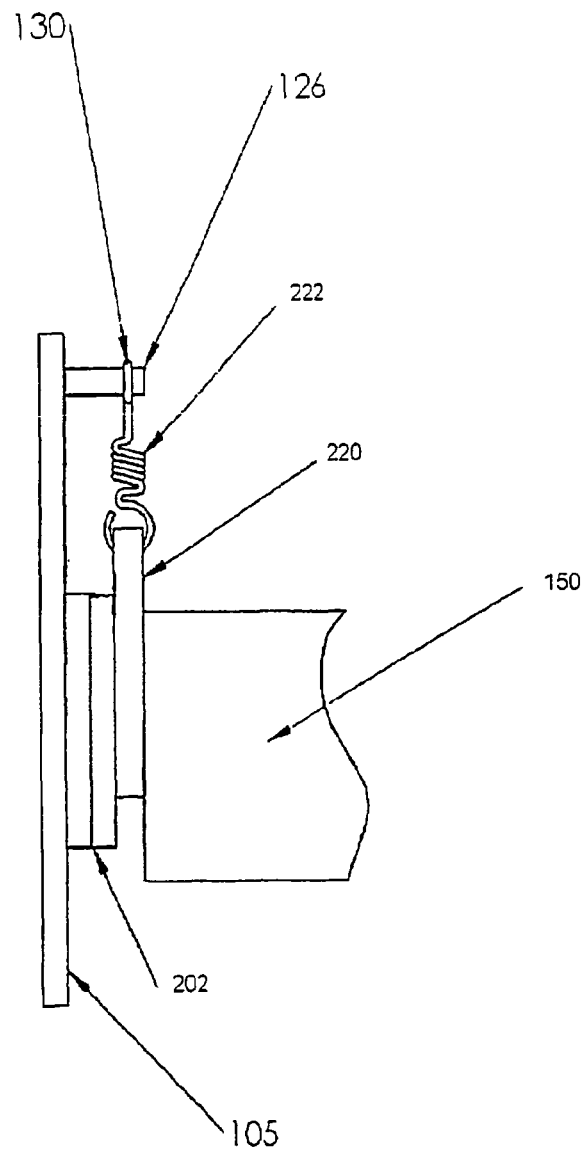
FIG. 16 is a side view of the slide and end plate of FIGS. 14 and 15, showing the end of the roller tube attached to the slide.

In order to offset a portion of the weight of the roller tube and associated material from the support cradle 32, springs are provided in accordance with the invention. In an embodiment illustrated in FIGS. 14-16, springs 222 and 224 are provided to lift the slide member 204 in a direction away from the support cradle 32. In particular, a first end 130 of spring 222 is attached to end plate 105 of the housing 201 via post or rivet 226. The rivet 226 has a groove 134 to accommodate the first end 130 of spring 222. The second end 123 of spring 222 is attached to the slide member 204. This attachment can either be made directly to the slide member 204, or via hole 119 of a mounting plate 220 as illustrated in FIGS. 14-16. As shown, mounting plate 220 is attached to the slide member 204 (e.g., via mounting holes 121, 127 which line up with holes 214, 216 of the slide member 204 shown in FIG. 13). Appropriate screws or bolts may be used to effect the mounting of the mounting plate 220 to the slide member 204, as will be apparent to those skilled in the art. Where the slide member 204 is attached to a drive motor 150 as illustrated in FIG. 16, the mounting plate 220 will be sandwiched between the slide member 204 and the motor 150, thereby holding the mounting plate tightly in place with respect to the slide member 204.

If a motor 150 is only provided at one end of the roller tube, as will be typical, it may not be necessary to provide springs or a mounting plate at the other end of the roller tube. This is because it will not be necessary to offset the weight of a motor at the other end of the roller tube. It has been found that providing a spring force in a direction away from the support cradle only at the motor side of the roller tube is effective in maintaining an even winding of the sheet material on the roller tube. However, if springs are provided at both ends of the roller tube, the slide member at the non-motor end may be bolted directly to the mounting plate 220, e.g., either by tapping (i.e., threading) the holes 214, 216 to accept bolts inserted through holes 121, 127 of the mounting plate, or by threading holes 121, 127 of the mounting plate to accept screws inserted through holes 214, 216 of the slide member. In the latter case, the heads of the bolts will be countersunk into the back of the slide member 204 so that there is no interference between the bolt heads and the face of the slide bracket 202, thereby assuring smooth sliding of the slide member within the slide bracket.

It is noted that where a motor is provided inside only one end of the roller tube, there is a tendency for the sheet material to wind up more tightly on the side of the roller tube with the motor. This is a significant problem, which can cause various problems such as jamming of the roller tube and/or folds or wrinkles in the sheet material wound on the roller tube. It is thought that this uneven winding might be caused by increased friction between the sheet material and the contacting surface of the support cradle 32 due to the weight of the motor. It might also be caused by the torque of the motor twisting the associated slide member with respect to its slide bracket, thereby increasing the friction therebetween. Such friction would make it harder for the slide to operate at the motor side of the roller tube, causing an imbalance between the two slides at the opposite ends of the roller tube. The present invention ameliorates this problem by offsetting at least part of the weight of the motor, roller tube and sheet material from the support cradle. With the structure of the present invention, uniform winding of the sheet material onto the roller tube is achieved whether or not there is a motor at one end of the tube.

Figure 18:
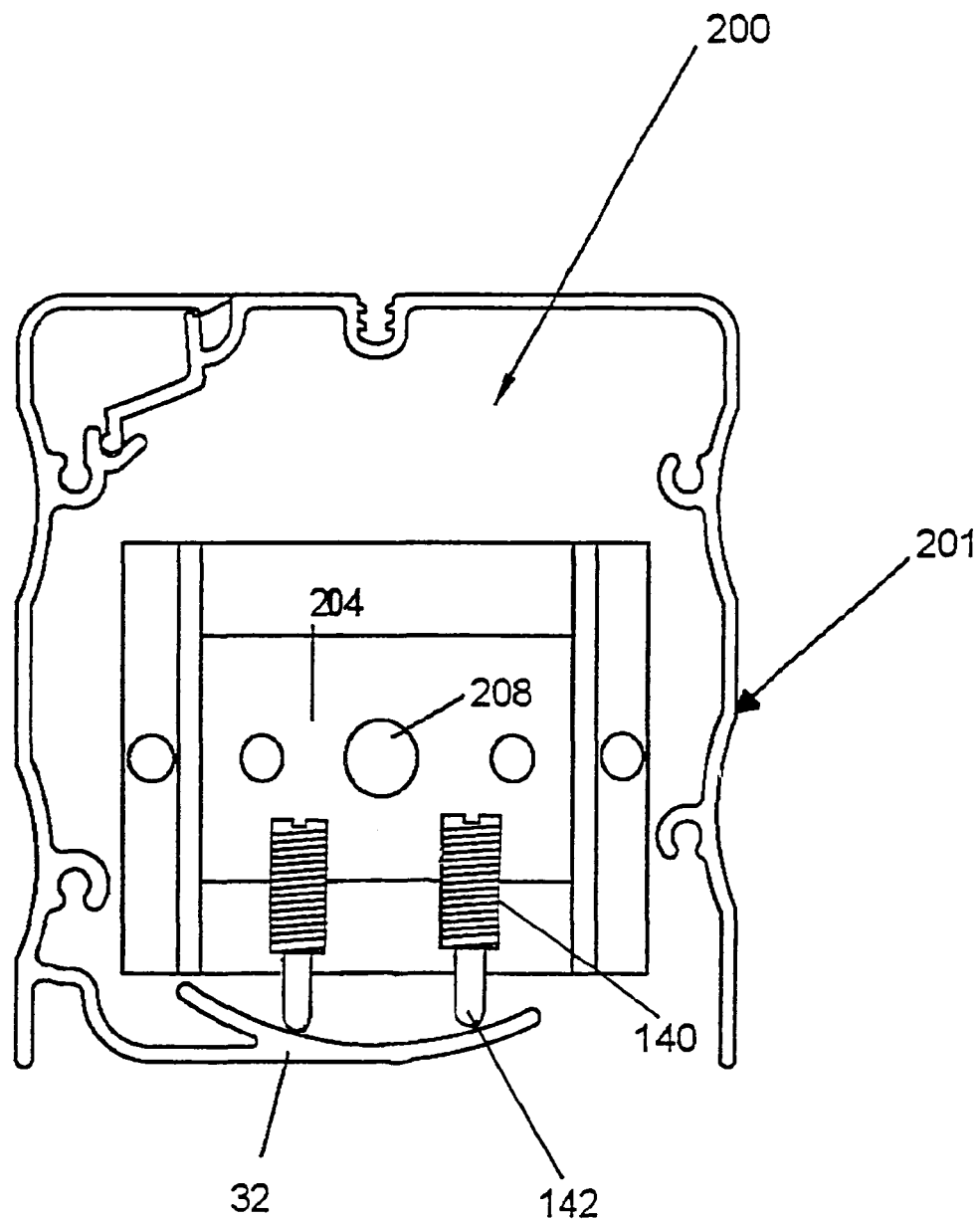
FIG. 18 is a view of another embodiment of the housing and slide, in which a pair of spring plungers is mounted to the slide member for applying a force against the housing.

A further solution to the problem of twist in the slide due to the torque of the motor is to position the spring at the motor end of the roller tube in an unsymmetrical manner that compensates for the tendency of the slide member to twist within the slide bracket. For example, instead of providing two springs 222 and 224 as shown the embodiment of FIGS. 14-16, just one of these springs can be provided. In particular, if the motor torque is in the counterclockwise direction as the material is wound onto the roller tube in the embodiment shown in FIG. 14, spring 222 alone can be used to offset the resultant counterclockwise twist of the slide member 204 within slide bracket 202. In the embodiment of FIG. 18, a similar result can be achieved by eliminating the rightmost spring plunger 140 while allowing the leftmost spring plunger to compensate for the counterclockwise twist of the slide member 204 within the slide bracket 202. In yet another embodiment, both springs 222 and 224 in FIGS. 14-16 could be provided, with, e.g., the spring 222 being a heavier (greater force) spring than the spring 224. Likewise, both plungers 140 shown in FIG. 18 could be provided, with, e.g., the leftmost plunger being adjusted to provide a greater spring force between the support cradle 32 and the slide member 204 than the rightmost plunger. Where the motor provides torque in the clockwise direction to wind the material on the roller tube, the springs or spring plungers can be designed to provide a greater force away from the support cradle on the right side of the slide member 204 shown in the drawings.

Turning back to FIGS. 14-16, spring 224, like spring 222 is connected at a first end 132 thereof to a post or rivet 128 at groove 136. The second end 125 of spring 224 is connected to the slide member 204, either directly or via hole 129 of mounting plate 220 as shown.

Figure 17:
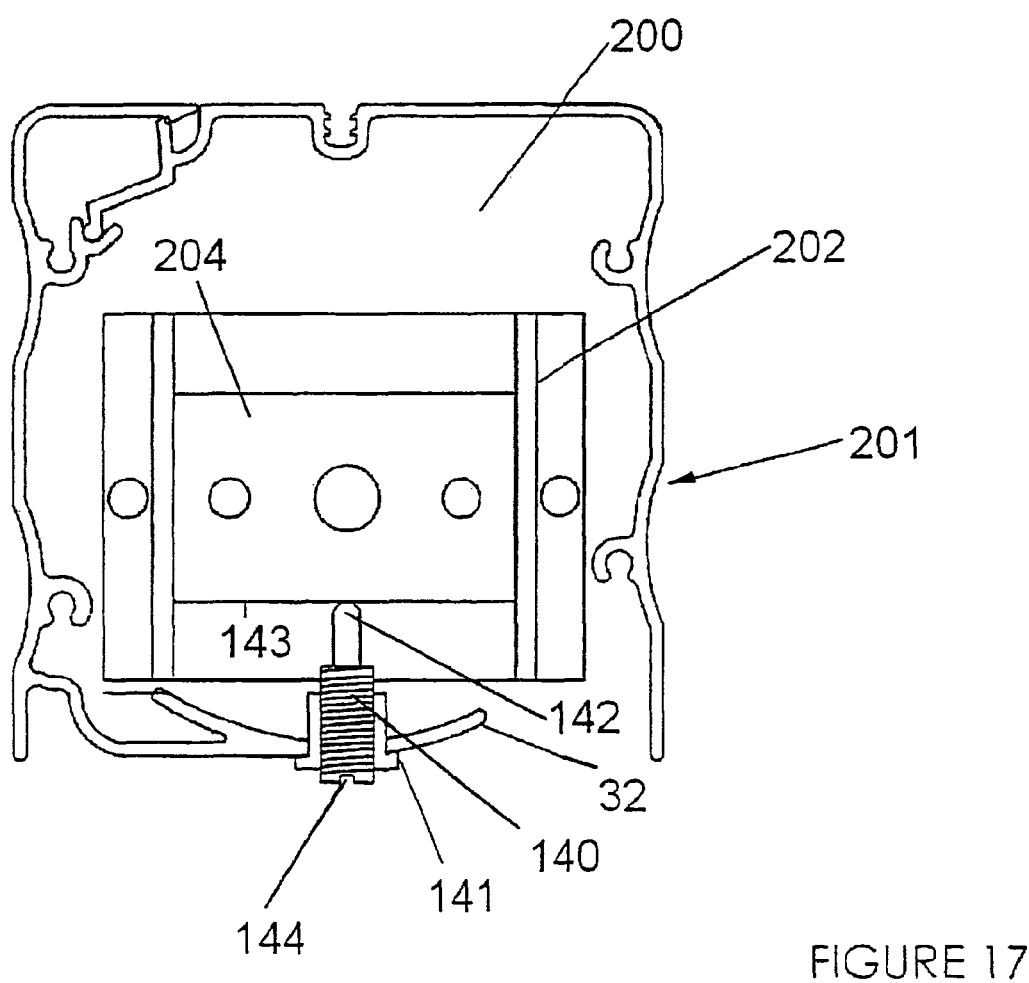
FIG. 17 is a view of another embodiment of the housing and slide, in which a spring plunger is attached to the housing and applies a force against the slide element.

In an embodiment illustrated in FIG. 17, a spring plunger is provided at least at one end of the housing assembly to provide an upward force against the slide member 204, thereby offsetting part of the weight of the roller tube and material carried thereby. Typically, a spring plunger will only be provided at one end of the housing, i.e., the motor end. However, embodiments are envisioned where such plungers are provided at both ends, offsetting the weight at each end of the roller tube.

Spring plunger assembly 140 is attached, e.g., via its threaded shaft and an associated locknut 141, to the outside end of cradle 32. The plunger portion 142 bears against an edge 143 of slide member 204. A spring internal to the assembly 140 provides a force that pushes the plunger portion 142 out of the plunger assembly 140. Such spring plungers are available, for example, from Jergens Inc. of Cleveland, Ohio (www.jergensinc.com). A hex drive 144 is provided in the spring plunger to adjust the amount of force provided by the plunger 142. This is useful in setting up a roller shade assembly or the like, by adjusting the force to a point were uniform roll up of the sheet material is achieved across the entire length of the roller tube.

In the embodiment of FIG. 18, a pair of spring plungers is provided for slide 200. As indicated above, a slide 200 is provided at each end of the housing assembly, in order to slidingly support the roller tube. However, the spring plungers may only be necessary at one end of the housing assembly, e.g., at the end where a motor is carried inside the roller tube.

As shown in FIG. 18, the spring plungers 140 are mounted to the slide member 204, e.g., by being screwed into threaded holes tapped into the bottom edge of the slide member. Plunger portions 142 bear against the ends of roller tube support cradle 32, in order to provide an upward force to the slide member 204. When the roller tube is supported by the slide member 204 (e.g., by inserting a shaft of the roller tube into the hole 208 of the slide member), a portion of the weight of the roller tube and associated material wound thereon and/or dispensed therefrom will be offset by the upward force of the spring plungers. It should be appreciated that although FIG. 18 shows the spring plungers 140 attached to the slide member 204 with the plungers bearing against the support cradle 32, the spring plungers could alternatively be attached to the support cradle 32, with the plunger portions 142 bearing against the slide member 204, as illustrated for the single spring plunger of FIG. 17.

Figure 21:
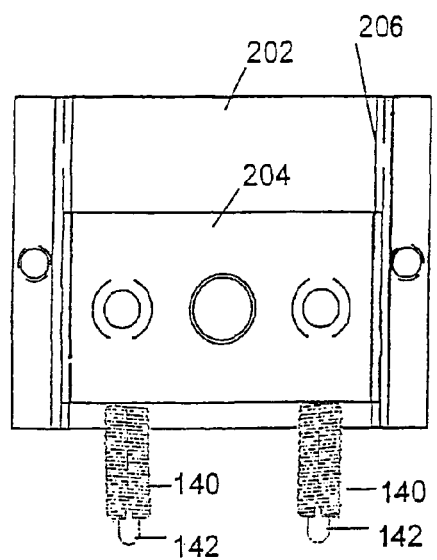
FIG. 21 is a front view of the slide and plunger components of FIG. 19.
Figure 19:
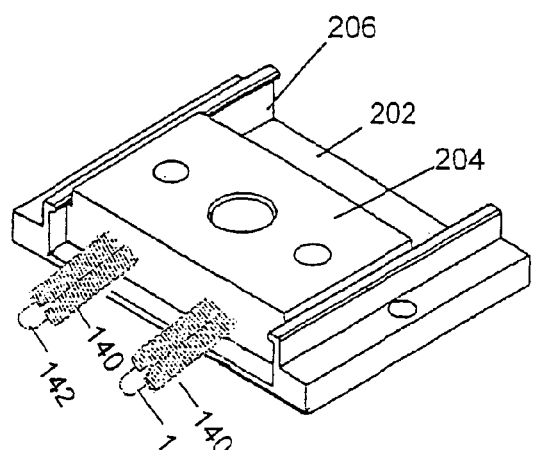
FIG. 19 is a perspective view of the slide and plunger components of FIG. 18.
Figure 20:
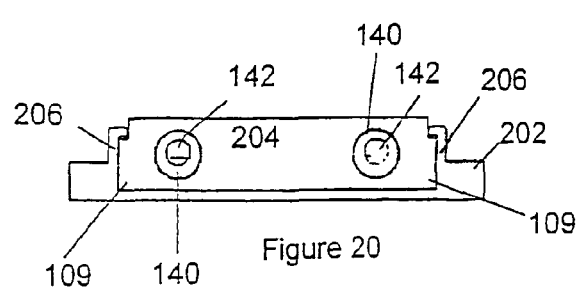
FIG. 20 is an end view of the slide and plunger components of FIG. 19.

FIGS. 19 to 21 provide perspective, bottom end, and front elevational views of the slide assembly of FIG. 18. The perspective view of FIG. 19, in particular, illustrates how the slide member 204 is adapted to slide within the channels or slots 206 of slide bracket 202.

Figure 22:
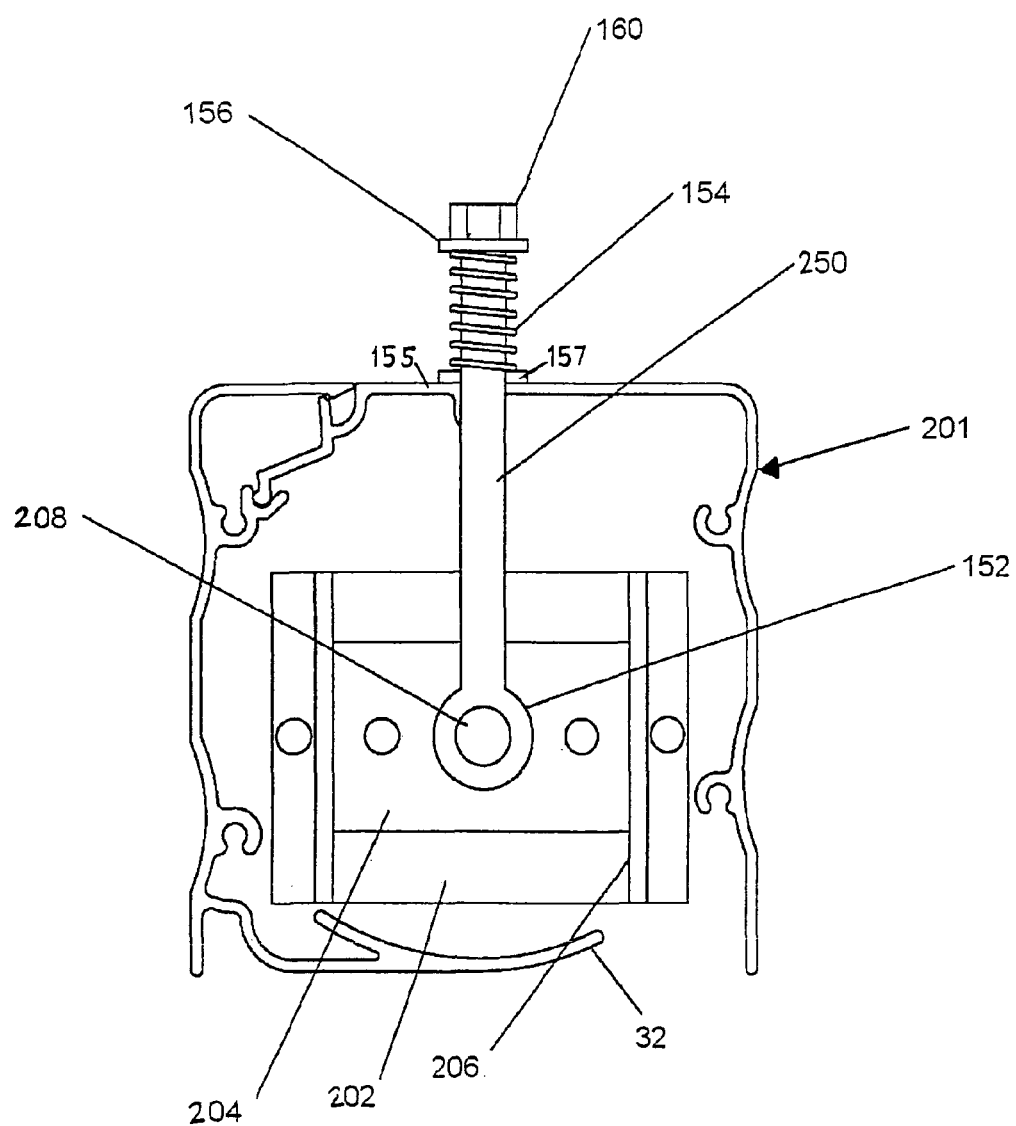
FIG. 22 is a view of the housing and slide, in which an adjustable compression spring is provided to apply a force to the slide member via a linkage.

FIG. 22 shows an embodiment where adjustable compression springs are provided to apply a force to one or both ends of a roller tube in an upward direction when the roller tube is positioned to dispense material therefrom in a downward direction. A coil spring 154 is provided around a linkage 250 that is connected, via eye portion 152, around a shaft at the end of the roller tube. The shaft of the roller tube (not shown in FIG. 22) is inserted into the hole 208 of slide member 204, and on its way into hole 208, passes through the eye portion 152 of the linkage 250. Thus, the force provided by spring 154 against washer 157 and the top wall 155 of housing 201 will be imparted along the linkage 250 to lift slide member 204, and thus the end of the roller tube which has its shaft inserted into hole 208, in an upward direction away from support cradle 32. This force will offset some of the weight of the roller tube and associated material from the support cradle 32. A cap nut 160 can be loosened or tightened against washer 156 to adjust the force provided by the compression spring 154. Typically, such an adjustable compression spring assembly will be provided only at the motor end of the roller tube, although such structure can be provided at both ends. As with the other spring embodiments, if springs are provided at both ends of the roller tube, it may be possible to use a lighter spring force at the non-motor end of the tube. Alternatively, a spring(s) provided at the non-motor end may be adjusted to provide less force in the direction away from the support cradle than the spring(s) at the motor end, in order to provide uniform winding of sheet material on the roller tube.

The roller tube support assemblies disclosed herein provide the advantage of supporting the roller tube without the need for complex moving parts. The roller tube and sheet material wrapped around the roller tube can be supported along their entire length. The problem of bowing and sagging across the roller tube and the resultant smile-shaped surface discontinuities on the sheet material are prevented as a result of the novel support assembly. Further advantages of the disclosed roller tube support assembly include the support cradle and assembly being formed integrally to improve strength, lower weight and reduce manufacturing costs. The novel assembly and support cradle allow for a variety of mounts to be employed in mounting the roller tube in the assembly. Moreover, a reduced diameter roller tube can be used, since the sheet material and roller tube are supported over the length of the roller tube, enabling a significant reduction of the size of the housing for the roller tube, as compared to prior art systems.

For example, a housing provided by the present invention may be only about 3 inches by 3 inches in cross-section for a given width solar screen, projection screen, or the like, whereas the prior art devices require larger diameter roller tubes for the same screen and are typically 8 inches by 8 inches or greater in cross-section. One skilled in the art will recognize that an assembly in accordance with the present invention can be provided in any practical size depending on the particular requirements of the application. Further, because of the small form factor of the roller tube system provided by the present invention (e.g., as compared to prior art screens) a roller tube system in accordance with the present invention may be mounted to the ceiling, whereas the prior art devices (especially projection screens) had to be recessed into the ceiling, often requiring cutting of joists and building new headers at considerable time and expense.

A further enhancement is the reduction of friction force between the sheet material wound on the roller tube and the support cradle while the roller tube is rotated. This allows lower power motors and drive shafts to be provided to overcome the resistance created by the friction between the support cradle and the material as it is wound and unwound on the roller tube. Various embodiments have been disclosed to offset a portion of the weight of the roller tube and associated material from the support cradle. By providing an upward force to one or both ends of the roller tube, e.g., via an appropriate spring force on a slide member riding within a slide bracket, the downward force of the roller tube and the material it carries is reduced on the support cradle. Such springs, when properly adjusted, also ensure that the sheet material will wind up evenly across the length of the roller tube.

While the present invention has been described with reference to various example embodiments, it will be understood by those skilled in the art that changes may be made and equivalents may be substituted for elements thereof without departing from the scope of the invention. It is intended that the invention not be limited to the particular embodiments disclosed herein for carrying out the invention, but that the invention include all embodiments falling within the scope of the appended claims.

What is claimed is:

1. Apparatus for slidingly supporting a roller tube with a first end, a second end, an axis of rotation and sheet material rolled thereon, said apparatus comprising:
 a first slide having a first slide bracket and a first slide member adapted to slide within said first slide bracket, said first slide member being adapted to carry a first end of a roller tube;
 a first spring coupled to said first slide member for applying a first force to the first end of the roller tube;
 a second slide having a second slide bracket and a second slide member adapted to slide within said second slide bracket, said second slide member being adapted to carry a second end of said roller tube;
 a second spring coupled to said second slide member for applying a second force to the second end of the roller tube;
 said first and second slide brackets being mounted at respective opposite ends of a roller tube housing with said roller tube extending from the first end thereof to the second end thereof within said housing between said slide brackets; and
 a support cradle positioned to support said roller tube and sheet material from beneath the roller tube, said support cradle being a fixed crescent-shaped member supported from said housing and extending below the axis of rotation of said roller tube;
 wherein said first and second forces are unequal forces and are applied to the first and second ends, respectively, of said roller tube in an upward direction when said roller tube is positioned in said housing to dispense material therefrom in a downward direction.

2. Apparatus in accordance with claim 1, wherein:
 said first spring comprises a pair of coil springs, each having a first end attached to an end plate of said housing and a second end attached to said first slide member.

3. Apparatus in accordance with claim 2 further comprising:
 a first mounting plate affixed to said first slide member, wherein:
 the second ends of said first pair of coil springs are attached to said first slide member via said first mounting plate.

4. Apparatus in accordance with claim 1, wherein:
 said first spring comprises a spring plunger mounted to said housing, with a plunger member thereof exerting pressure against an edge of said first slide member to provide said first force.

5. Apparatus in accordance with claim 1, wherein:
said first spring comprises a spring plunger mounted to said first slide member, with a plunger member thereof exerting pressure against said housing to provide said first force.

6. Apparatus in accordance with claim 1, wherein:
said first spring comprises a first pair of spring plungers mounted to said first slide member, with a plunger member of each of said first pair exerting pressure against said housing to provide said first force.

7. Apparatus in accordance with claim 1, wherein:
said first spring comprises an adjustable compression spring exerting pressure on a first linkage member, said first linkage member being coupled to a first shaft portion at the first end of said roller tube, said first shaft portion being coupled to said first slide member.

8. Apparatus in accordance with claim 1, wherein said first spring provides an uneven force across the first slide member to compensate for a tendency of the first slide member to twist relative to the first slide bracket.

9. Apparatus in accordance with claim 1 wherein each of said first and second slide brackets comprises opposed slots or rails on which corresponding rails or slots of said respective first and second slide members ride.

10. The apparatus of claim 1, wherein each said slide member is generally rectangular and includes top and bottom edges having a first length and first and second sides having a second length, said second length being greater than said first length.

11. The apparatus of claim 1, wherein each of said first and second springs include means for adjusting the first and second forces generated by said first and second springs, respectively.

12. The apparatus of claim 1, wherein each of said first and second springs includes a mechanical adjustment to vary the first and second forces generated by said first and second springs, respectively, without replacement of said first and second springs.

13. Apparatus for slidingly supporting a roller tube and sheet material wound thereon, comprising:
a first shaft portion extending from a first end of said roller tube and a second shaft portion extending from a second end of said roller tube;
a first slide member coupled to said first shaft portion;
a second slide member coupled to said second shaft portion;
a first slide bracket for receiving said first slide member and allowing said first slide member to slide therein;
a second slide bracket for receiving said second slide member and allowing said second slide member to slide therein;
a first end plate having said first slide bracket mounted thereto; and
a second end plate having said second slide bracket mounted thereto;
said first and second end plates being adapted for mounting on a structure with said first and second slide brackets, said first and second slide members, and said roller tube supported for rotation therebetween;
a housing comprising said first end plate at one end thereof and said second end plate at an opposite end thereof;
a support cradle positioned to support said roller tube and sheet material from beneath the roller tube, said support cradle being a fixed crescent-shaped member supported from said housing and extending below the axis of rotation of said roller tube;
a first spring coupled to said first slide member for applying a first force to the first end of the roller tube in an upward direction when said roller tube is positioned in said housing to dispense material therefrom in a downward direction; and
a second spring coupled to said second slide member for applying a second force to the second end of the roller tube in an upward direction when said roller tube is positioned in said housing to dispense material therefrom in a downward direction,
wherein said first and second slide members and said first and second slide brackets control movement of said roller tube relative to said support cradle as said sheet material is wound and unwound on said roller tube and said first and second forces are not equal to each other.

14. Apparatus in accordance with claim 13, wherein:
said first spring comprises a pair of coil springs, each having a first end attached to said first end plate and a second end attached to said first slide member; and
said second spring comprises a pair of coil springs, each having a first end attached to said second end plate and a second end attached to said second slide member.

15. Apparatus in accordance with claim 14 further comprising at least one of:
a first mounting plate affixed to said first slide member; and
a second mounting plate affixed to said second slide member;
wherein:
the second ends of said first pair of coil springs are attached to said first slide member via said first mounting plate, and
the second ends of said second pair of coil springs are attached to said second slide member via said second mounting plate.

16. Apparatus in accordance with claim 13, wherein:
said first spring comprises a spring plunger mounted to said housing, with a plunger member thereof exerting pressure against an edge of said first slide member to provide said first force; and
said second spring comprises a spring plunger mounted to said housing, with a plunger member thereof exerting pressure against an edge of said second slide member to provide said second force.

17. Apparatus in accordance with claim 13, wherein:
said first spring comprises a spring plunger mounted to said first slide member, with a plunger member thereof exerting pressure against said housing to provide said first force; and
said second spring comprises a spring plunger mounted to said second slide member, with a plunger member thereof exerting pressure against said housing to provide said second force.

18. Apparatus in accordance with claim 13 wherein:
said first spring comprises a first pair of spring plungers mounted to said first slide member, with a plunger member of each of said first pair exerting pressure against said housing to provide said first force; and
said second spring comprises a second pair of spring plungers mounted to said second slide member, with a plunger member of each of said second pair exerting pressure against said housing to provide said second force.

19. Apparatus in accordance with claim 13, wherein:
said first spring comprises an adjustable compression spring exerting pressure on a first linkage member, said first linkage member being coupled to said first shaft portion; and said second spring comprises an adjustable compression spring exerting pressure on a second linkage member, said second linkage member being coupled to said second shaft portion.

20. Apparatus in accordance with claim 13 wherein each of said first and second slide brackets comprises opposed slots or rails on which corresponding rails or slots of said respective first and second slide members ride.

21. Apparatus in accordance with claim 13, wherein at least one of said first force or second force is applied unevenly across its respective slide member to compensate for a tendency of the respective slide member to twist relative to its slide bracket.

* * * * *